(12) United States Patent
Wang et al.

(10) Patent No.: US 11,460,740 B2
(45) Date of Patent: Oct. 4, 2022

(54) ARRAY SUBSTRATE, BACKLIGHT MODULE, DISPLAY PANEL, DISPLAY DEVICE, AND PREPARATION METHOD

(71) Applicant: Shanghai Tianma Micro-Electronics Co., Ltd., Shanghai (CN)

(72) Inventors: Meilin Wang, Shanghai (CN); Xiaodong Yang, Shanghai (CN); Jiayin Tang, Shanghai (CN); Qiongqin Mao, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/012,480

(22) Filed: Sep. 4, 2020

(65) Prior Publication Data

US 2021/0389635 A1    Dec. 16, 2021

(30) Foreign Application Priority Data

Jun. 10, 2020   (CN) .......................... 202010522957.8

(51) Int. Cl.
*G02F 1/1362* (2006.01)
*G02F 1/13357* (2006.01)
*G02F 1/1368* (2006.01)
*G09G 3/36* (2006.01)

(52) U.S. Cl.
CPC ...... *G02F 1/136286* (2013.01); *G02F 1/1368* (2013.01); *G02F 1/133603* (2013.01); *G09G 3/3677* (2013.01); *G09G 3/3688* (2013.01)

(58) Field of Classification Search
CPC ......... G02F 1/133615; G02F 1/133602; G02F 1/133603; H01H 2219/036; H01L 27/153; H01L 31/143; F21K 9/66; F21V 5/004
See application file for complete search history.

(56) References Cited

U.S. PATENT DOCUMENTS

| | | | |
|---|---|---|---|
| 2007/0195044 A1* | 8/2007 | Uemoto | G02F 1/133603 345/92 |
| 2016/0240561 A1* | 8/2016 | Saito | H01L 27/1225 |
| 2018/0144691 A1* | 5/2018 | Choi | G09G 3/342 |
| 2020/0110307 A1* | 4/2020 | Chang | H01L 25/0753 |
| 2021/0026198 A1* | 1/2021 | Jeong | G02F 1/133603 |
| 2021/0116749 A1* | 4/2021 | Kao | G02F 1/133602 |

FOREIGN PATENT DOCUMENTS

| | | |
|---|---|---|
| CN | 104217994 A | 12/2014 |
| KR | 100671655 B1 | 1/2007 |

* cited by examiner

*Primary Examiner* — Mariam Qureshi
(74) *Attorney, Agent, or Firm* — von Briesen & Roper, s.c.

(57) ABSTRACT

An array substrate includes a plurality of driving units, where each of the plurality of driving units includes a first electrode, a second electrode and at least one thin film transistor; the first electrode and the second electrode are configured to be connected to an anode and a cathode of a light-emitting diode, respectively, such that a vertical projection of the light-emitting diode on the array substrate overlaps with the at least one thin film transistor, and in a light-emitting direction of the light-emitting diode, the at least one thin film transistor is disposed on a backlight side of the light-emitting diode; and each of the plurality of driving units controls the light-emitting diode to be turned on or off according to a driving signal.

10 Claims, 13 Drawing Sheets

ARRAY SUBSTRATE, BACKLIGHT MODULE, DISPLAY PANEL, DISPLAY DEVICE, AND PREPARATION METHOD

CROSS-REFERENCE TO RELATED APPLICATION(S)

This application claims priority to Chinese Patent Application No. 202010522957.8 filed on Jun. 10, 2020, the disclosure of which is incorporated herein by reference in its entirety.

TECHNICAL FIELD

The present disclosure relates to the field of display technologies and, in particular, to an array substrate, a backlight module, a display panel, a display device, and a preparation method.

BACKGROUND

With many advantages such as a thin body, power saving and no radiation, a flat panel display device has been widely used. A thin film transistor (TFT) is used as the core element of the flat panel display device. In an existing process for preparing a display panel, various semiconductor materials and processes are employed to prepare an active layer, to improve carrier mobility of the thin film transistor and increase a response speed, etc.

However, since the active layer of thin film transistors is greatly affected by light, heat, and electricity, the active layer in the existing display panel is susceptible to light during a display process, resulting in a threshold voltage drift of the thin film transistors, an electrical failure, and a reduced product yield. Therefore, a light-shielding layer is generally disposed in the existing process to protect the thin film transistor from being affected by external light. Although the light-shielding layer is disposed to ensure the performance of the thin film transistor, two masks are required additionally and two preparation procedures are added, and thus an array substrate is prepared with more complicated preparation processes and higher production costs.

SUMMARY

The present disclosure provides an array substrate, a backlight module, a display panel, a display device, and a preparation method, to remove a process of a light-shielding layer under the premise of ensuring that a thin film transistor is protected from being affected by light, and reduce process complexity and costs.

In a first aspect, an embodiment of the present disclosure provides an array substrate, including a plurality of driving units.

Each of the plurality of driving units includes a first electrode, a second electrode and at least one thin film transistor.

The first electrode and the second electrode are configured to be connected to an anode and a cathode of a light-emitting diode, respectively, such that a vertical projection of the light-emitting diode on the array substrate overlaps with the at least one thin film transistor, and in a light-emitting direction of the light-emitting diode, the at least one thin film transistor is disposed on a backlight side of the light-emitting diode.

The each of the plurality of driving units is configured to control the light-emitting diode to be turned on or off according to a driving signal.

In a second aspect, an embodiment of the present disclosure further provides a backlight module, including the array substrate described in the first aspect.

The backlight module further includes a plurality of light-emitting diodes, where each of the plurality of light-emitting diodes is arranged in a one-to-one correspondence with a respective one of the plurality of driving units in the array substrate. An anode and a cathode of the each of the plurality of light-emitting diodes are electrically connected to a first electrode and a second electrode in a respective one of the plurality of driving units, respectively, and a vertical projection of the each of the plurality of light-emitting diodes on the array substrate overlaps with at least one thin film transistor in the respective one of the plurality of driving units.

In a third aspect, an embodiment of the present disclosure further provides a liquid crystal display panel which includes the backlight module described in the second aspect, and further includes a liquid crystal panel which is disposed on a light-emitting side of the backlight module.

In a fourth aspect, an embodiment of the present disclosure further provides a light-emitting diode display panel including the array substrate described in the first aspect.

The light-emitting diode display panel further includes a plurality of light-emitting diodes, where each of the plurality of light-emitting diodes is arranged in a one-to-one correspondence with a respective one of a plurality of driving units in the array substrate. An anode and a cathode of the each of the plurality of light-emitting diodes are electrically connected to a first electrode and a second electrode in a respective one of the plurality of driving units, respectively, and a vertical projection of the each of the plurality of light-emitting diodes on the array substrate overlaps with at least one thin film transistor in the respective one of the plurality of driving units.

In a fifth aspect, an embodiment of the present disclosure further provides a preparation method for a backlight module or a light-emitting diode display panel, in which the array substrate described in the first aspect is adopted. The preparation method includes steps described below.

The array substrate is provided.

A plurality of light-emitting diodes is formed on the array substrate, where each of the plurality of light-emitting diodes is arranged in a one-to-one correspondence with a respective one of a plurality of driving units in the array substrate, an anode and a cathode of each of the plurality of light-emitting diodes are electrically connected to a first electrode and a second electrode in a respective one of the plurality of driving units, respectively, and a vertical projection of each of the plurality of light-emitting diodes on the array substrate overlaps with the at least one thin film transistor in the respective one of the plurality of driving units.

In a sixth aspect, an embodiment of the present disclosure further provides a display device, including the liquid crystal display panel described in the third aspect or the light-emitting diode display panel described in the fourth aspect.

In the array substrate, backlight module, display panel, display device, and preparation method provided by the embodiments of the present disclosure, the array substrate is configured to include the plurality of driving units, where the driving unit includes the first electrode, the second electrode and the at least one thin film transistor, the first electrode and the second electrode are configured to be connected to the anode and the cathode of the light-emitting diode, respectively, such that the vertical projection of the light-emitting diode on the array substrate overlaps with the at least one thin film transistor, and in the light-emitting direction of the light-emitting diode, the at least one thin film transistor is disposed on the backlight side of the light-emitting diode. The driving unit is configured to control the light-emitting diode to be turned on or off according to the driving signal. Positions of the first electrode and the second electrode in the driving unit of the array substrate are reasonably set, such that the light-emitting diode covers at least part of the thin film transistors in the driving unit on the array substrate, thereby the light-emitting diode is served as the light-shielding layer for blocking the external light. The embodiments of the present disclosure solve the problem of complicated preparation processes due to the additional arrangement of the light-shielding layer in an existing array substrate. The light-shielding layer is replaced with the light-emitting diode to block the external light, which can prevent the thin film transistor from being affected by the external light, ensure electrical characteristics of the thin film transistor, and further save masks and preparation procedures required for preparing the light-shielding layer, therefore a process for preparing the array substrate can be simplified and manufacturing costs can be reduced.

DETAILED DESCRIPTION

Figure 1:
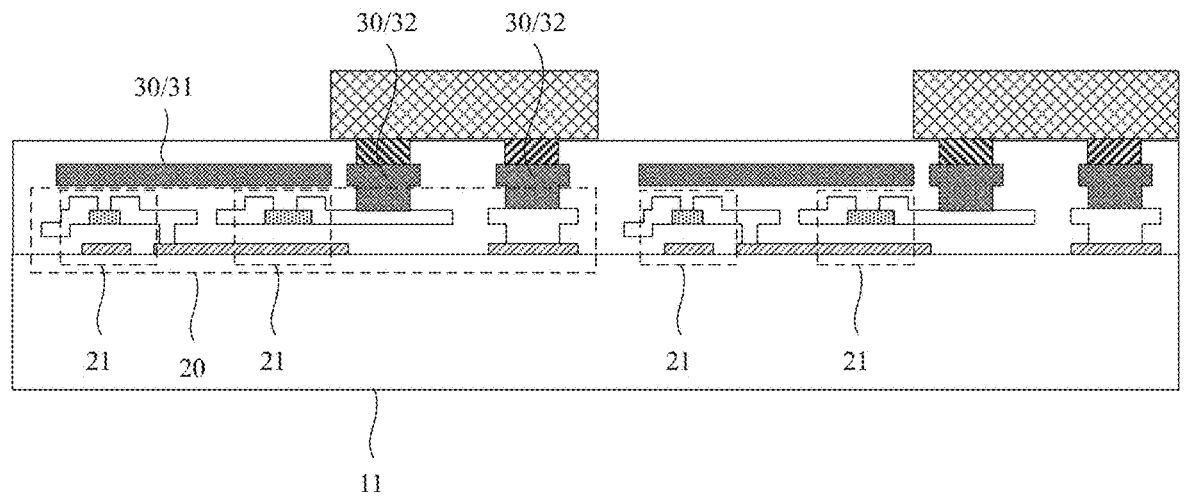
FIG. 1 is a structural diagram of an existing array substrate.

Hereinafter the present disclosure will be further described in detail in conjunction with the drawings and embodiments. It is understood that the specific embodiments set forth herein are intended to explain the present disclosure and not to limit the present disclosure. Additionally, it is noted that for ease of description, merely part, not all, of the structures related to the present disclosure are illustrated in the drawings.

As described in the background, in an existing panel preparation process, a light-shielding layer generally needs to be provided to shield light, to prevent a thin film transistor from being affected by light. FIG. 1 is a structural diagram of an existing array substrate. Referring to FIG. 1, in the array substrate, a driving unit 20 disposed on a base substrate 11 includes a thin film transistor 21, and a light-shielding layer 30 is disposed on a side of the thin film transistor 21 facing away from the base substrate 11. A vertical projection of the thin film transistor 21 on the base substrate 11 is located in a vertical projection of a light-shielding pattern 31 in the light-shielding layer 30 on the base substrate 11, that is, the light-shielding pattern 31 in the light-shielding layer 30 covers a region where the thin film transistor 21 is located, so as to shield external light and avoid a threshold voltage drift of the thin film transistor 21 due to an effect of the external light, thereby ensuring electrical performance of the thin film transistor. However, when the light-shielding layer 30 is prepared on the thin film transistor 21, not only the light-shielding pattern 31 needs to be formed, but also extraction electrodes 32 need to be formed in the light-shielding layer 30 to draw electrodes in the driving unit 20 on the array substrate to an upper layer. Since the extraction electrodes 32 need to be electrically connected to the electrodes in a lower layer, the extraction electrodes 32 and the light-shielding pattern 31 have different etching depths, and therefore, they need to be etched separately. Therefore, in preparation procedures for the light-shielding layer 30, two masks need to be provided, and two photolithography procedures are required to prepare the light-shielding pattern 31 and the extraction electrodes 32 respectively. Apparently, the addition of the light-shielding layer in the existing process for preparing the array substrate results in more complicated procedures and higher costs.

In terms of the above technical problem, embodiments of the present disclosure provide an array substrate. The array substrate includes a plurality of driving units, where each of the plurality of driving units includes a first electrode, a second electrode and at least one thin film transistor. The first electrode and the second electrode are configured to be connected to an anode and a cathode of a light-emitting diode, respectively, such that a vertical projection of the light-emitting diode on the array substrate overlaps with the at least one thin film transistor, and in a light-emitting direction of the light-emitting diode, the at least one thin film transistor is disposed on a backlight side of the light-emitting diode. The each of the plurality of driving units is configured to control the light-emitting diode to be turned on or off according to a driving signal.

The array substrate generally is composed of a base substrate and a circuit structure provided thereon, where the circuit structure is configured to control a light-emitting unit to be turned on. The circuit structure may be divided into a plurality of driving units, and each driving unit controls one corresponding light-emitting unit. The driving unit is generally provided with thin film transistors for switching or driving control. The thin film transistor includes an active layer. When a gate electrode of the thin film transistor is provided with a control signal, the active layer will accumulate charges under an electric field formed by a voltage of the gate electrode. When a voltage is provided between a source electrode of the thin film transistor and a drain electrode of the thin film transistor, a channel through which carriers flow may be formed, such that the thin film transistor is turned on and can achieve the function of switching or driving.

The array substrate is used to prepare light-emitting units thereon. Generally, light-emitting diodes are served as the light-emitting units. The light-emitting diodes are electrically connected to the driving units on the array substrate in a one-to-one correspondence. A driving signal is provided to the driving units on the array substrate to control a plurality of light-emitting diodes to be turned on, where the plurality of light-emitting diodes cooperate to achieve backlight or a picture display. When the first electrode and the second electrode in the driving unit are arranged, the anode and the cathode of the light-emitting diode are connected to the first electrode and the second electrode, respectively, such that the vertical projection of the light-emitting diode on the array substrate overlaps with the at least one thin film transistor. In this way, it can be ensured that each light-emitting diode can cover at least part of the at least one thin film transistor in the corresponding driving unit when it is connected to the array substrate. In this case, by setting the positions of the first electrode and the second electrode in the driving unit, the light-emitting diode can be used as the light-shielding layer of the thin film transistor to block the external light incident into the thin film transistor, and the array substrate can also omit manufacturing procedures of the light-shielding layer. It is noted that the structure of the light-emitting diode assists in implementing the above array substrate. A light-emitting direction of the light-emitting diode connected to the array substrate is a side facing away from the array substrate. Therefore, the anode and the cathode of the light-emitting diode are disposed on the backlight side of the light-emitting diode. In this case, the thin film transistor on the array substrate is disposed on the backlight side of the light-emitting diode to avoid an effect of emitted light on the thin film transistor.

The array substrate provided by the embodiments of the present disclosure is configured with the plurality of driving units, where the driving unit includes the first electrode, the second electrode and the at least one thin film transistor, the first electrode and the second electrode are configured to be connected to the anode and the cathode of the light-emitting diode, respectively, such that the vertical projection of the light-emitting diode on the array substrate overlaps with the at least one thin film transistor, and in the light-emitting direction of the light-emitting diode, the at least one thin film transistor is disposed on the backlight side of the light-emitting diode. The driving unit is configured to control the light-emitting diode to be turned on or off according to the driving signal. Positions of the first electrode and the second electrode in the driving unit of the array substrate are reasonably set, such that the light-emitting diode covers at least part of the thin film transistors in the driving unit on the array substrate, thereby the light-emitting diode is served as the light-shielding layer for blocking the external light. The embodiments of the present disclosure solve the problem of complicated preparation processes due to the additional arrangement of the light-shielding layer in an existing array substrate. The light-shielding layer is replaced with the light-emitting diode to block the external light, which can prevent the thin film transistor from being affected by the external light, ensure electrical characteristics of the thin film transistor, and further save masks and preparation procedures required for preparing the light-shielding layer, therefore a process for preparing the array substrate can be simplified and manufacturing costs can be reduced.

The above is the core concept of the present disclosure, and technical solutions in the embodiments of the present disclosure will be described clearly and completely in conjunction with the drawings in the embodiments of the present disclosure. Based on the embodiments of the present disclosure, all other embodiments obtained by those skilled in the art without creative work shall fall within the protection scope of the present disclosure.

In the above array substrate, when designing the positions of the first electrode, the second electrode and the thin film transistor in the driving unit, it is necessary to consider a size of the light-emitting diode and positions of its electrodes. Generally, a chip of the existing light-emitting diode has a relatively small size. To avoid an electrical connection between the anode and the cathode, the anode and the cathode are generally disposed at two ends of the light-emitting diode. In view of this, when designing the positions of the first electrode, the second electrode and the at least one thin film transistor in the driving unit on the array substrate provided by the embodiments of the present disclosure, the first electrode and the second electrode may be arranged on two sides of the at least one thin film transistor. In this case, the light-emitting diode is connected to the first electrode and the second electrode in the driving unit, and covers the thin film transistor between the first electrode and the second electrode to achieve an effect of the light-shielding layer. Of course, in the array substrate provided by the embodiments of the present disclosure, the first electrode and the second electrode may also be arranged on a same side of the at least one thin film transistor. To achieve a light-shielding effect, not only a shape of the light-emitting diode needs to be properly designed, but also relative positions of the at least one thin film transistor and the first electrode plus the second electrode need to reasonably set, therefore when the light-emitting diode is connected to the first electrode and the second electrode, the at least one thin film transistor in the driving unit covered by the light-emitting diode can be achieved by the designed structure. Exemplarily, the size of the light-emitting diode may be appropriately enlarged, and the thin film transistor may be moved to the vicinity of the first electrode and the second electrode, to ensure that the light-emitting diode and the thin film transistor are stacked in position.

Figure 2:
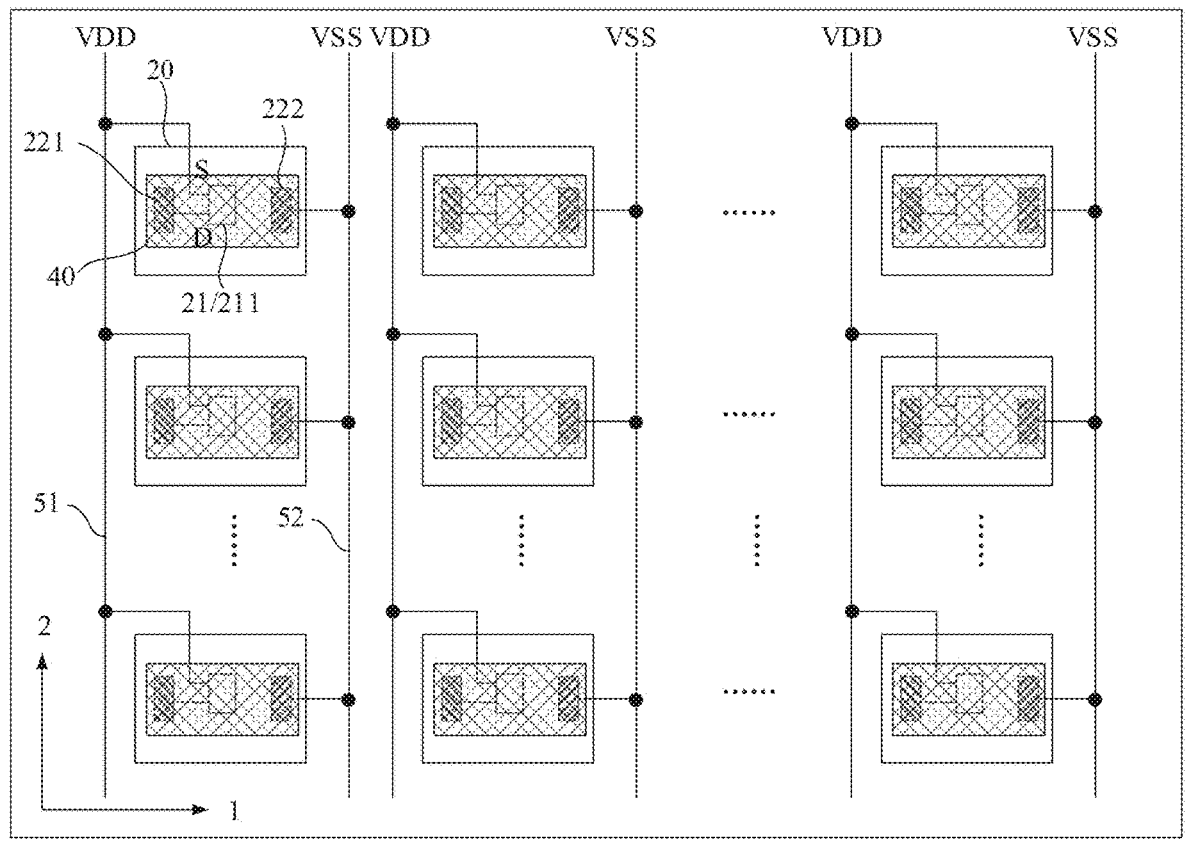
FIG. 2 is a structural diagram of an array substrate according to an embodiment of the present disclosure.
Figure 3:
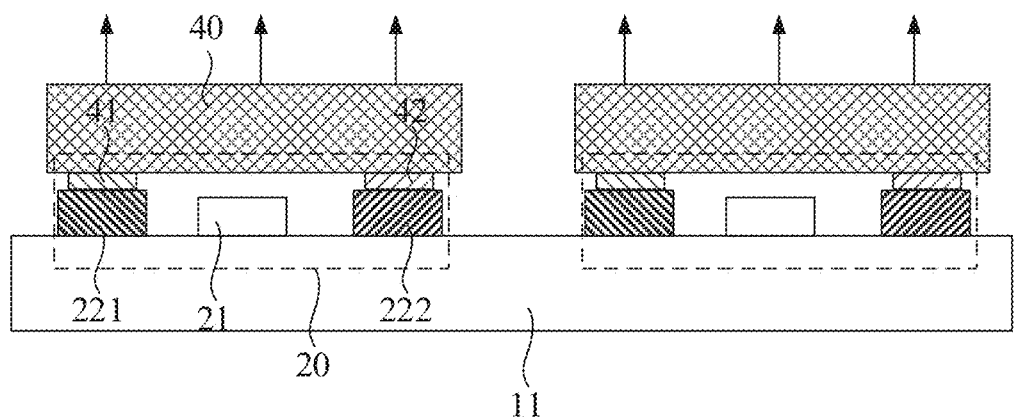
FIG. 3 is a sectional view of the array substrate illustrated in FIG. 2.

An embodiment of the present disclosure provides an array substrate on the basis of the embodiments described above. FIG. 2 is a structural diagram of an array substrate according to the embodiment of the present disclosure. FIG. 3 is a sectional view of the array substrate illustrated in FIG. 2. Referring to FIG. 2 and FIG. 3, the array substrate includes a plurality of driving units 20, where the driving unit 20 includes a first electrode 221, a second electrode 222 and at least one thin film transistor 21. The first electrode 221 and the second electrode 222 are configured to be connected to an anode 41 and a cathode 42 of a light-emitting diode 40, respectively, such that a vertical projection of the light-emitting diode 40 on the array substrate overlaps with the at least one thin film transistor 21, and in a light-emitting direction of the light-emitting diode 40, the thin film transistor 21 is disposed on a backlight side of the light-emitting diode 40. The driving unit 20 is configured to control the light-emitting diode 40 to be turned on or off according to a driving signal. Optionally, in a direction perpendicular to the light-emitting direction of the light-emitting diode 40, the first electrode 221 and the second electrode 222 are disposed on opposite sides of the at least one thin film transistor 21, respectively.

As shown in FIG. 3, when the light-emitting diode 40 is connected to the driving unit 20 in the array substrate, since the first electrode 221 and the second electrode 222 are disposed on two sides of the at least one thin film transistor 21, respectively, the light-emitting diode 40 straddles the thin film transistor 21 when the anode 41 and the cathode 42 of the light-emitting diode 40 are connected to the first electrode 221 and the second electrode 222, respectively, and thus the thin film transistor 21 is shield from light. It should be noted that in the driving unit 20 in FIG. 3, the number of thin film transistors 21 may not be limited to one. In a case where the driving unit 20 includes a plurality of thin film transistors 21, the plurality of thin film transistors 21 may be reasonably arranged between the first electrode 221 and the second electrode 222, so that the light-emitting diode 40 covers all the thin film transistors 21 when it is connected to the driving unit 20, so as to prevent the electrical performance of the thin film transistors 21 from being affected by light and ensure the normal working of the driving unit.

With continued reference to FIG. 2 and FIG. 3, generally, in consideration of attaching procedures of light-emitting diodes, to ensure that the light-emitting diodes are attaching in batches, positions of the electrodes of each driving unit 20 in the array substrate may be consistent. Specifically, the array substrate further includes a plurality of first power signal lines 51 and a plurality of second power signal lines 52, where the plurality of first power signal lines 51 and the plurality of second power signal lines 52 are all arranged in sequence along a row direction 1 and extend along a column direction 2. The plurality of driving units 20 are arranged in an array. The at least one thin film transistor 21 further includes a driving transistor 211. In each driving unit 20, a drain electrode D of the driving transistor 211 is electrically connected to the first electrode 221; source electrodes S of driving transistors 211 of driving units 20 in a same column are electrically connected to a same first power signal line 51; second electrodes 222 of the driving units 20 in the same column are electrically connected to a same second power signal line 52; and in the row direction 1, the first electrode 221 and the second electrode 222 are alternately arranged in sequence.

In this case, relative positions of the first electrode 221 and the second electrode 222 in each driving unit 20 are consistent. For example, as shown in FIG. 2 and FIG. 3, in each driving unit 20, the first electrode 221 is disposed on a left side of the second electrode 222, and the first power signal lines 51 and the second power signal lines 52 which are electrically connected to source electrodes S of the driving transistors 211 and second electrodes 222 in drive units 20 in a same row are alternately arranged in sequence. Apparently, when the light-emitting diodes are attached to the array substrate in correspondence with the driving units 20, since the anode and the cathode of the light-emitting diode 40 correspond to the first electrode 221 and the second electrode 222 of the driving unit 20, the light-emitting diodes 40 have the same orientation. For light-emitting diodes 40 formed by segment, an array of light-emitting diodes on a blue film may be subjected to a film expansion process to expand an interval between light-emitting diodes 40 until they are in a one-to-one correspondence with the driving units 20 in the array substrate, so as to achieve alignment and attaching in batches and further achieve the welding of the light-emitting diode 40.

Figure 4:
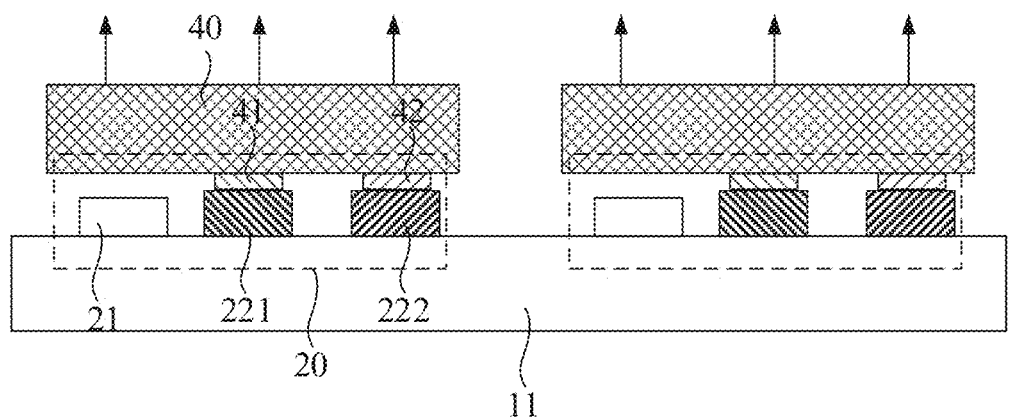
FIG. 4 is a sectional view of another array substrate according to an embodiment of the present disclosure.

With respect to a solution in which the first electrode and the second electrode are arranged at two sides of the at least one thin film transistor in the array substrate shown in FIG. 2 and FIG. 3, an embodiment of the present disclosure further provides an array substrate. FIG. 4 is a sectional view of another array substrate according to the embodiment of the present disclosure. Referring to FIG. 4, optionally, in the array substrate, a shape and a structure of the light-emitting diode 40 are reasonably and appropriately designed to appropriately enlarge the size of the light-emitting diode 40, and positions of the anode 41 and the cathode 42 are adjusted, such that when the first electrode 221 and the second electrode 222 are arranged on the same side of the at least one thin film transistor 21, the vertical projection of the light-emitting diode 40 correspondingly connected to the first electrode 221 and the second electrode 222 on the array substrate overlaps with the at least one thin film transistor 21, that is, the light-emitting diode 40 covers the thin film transistor 21.

Figure 5:
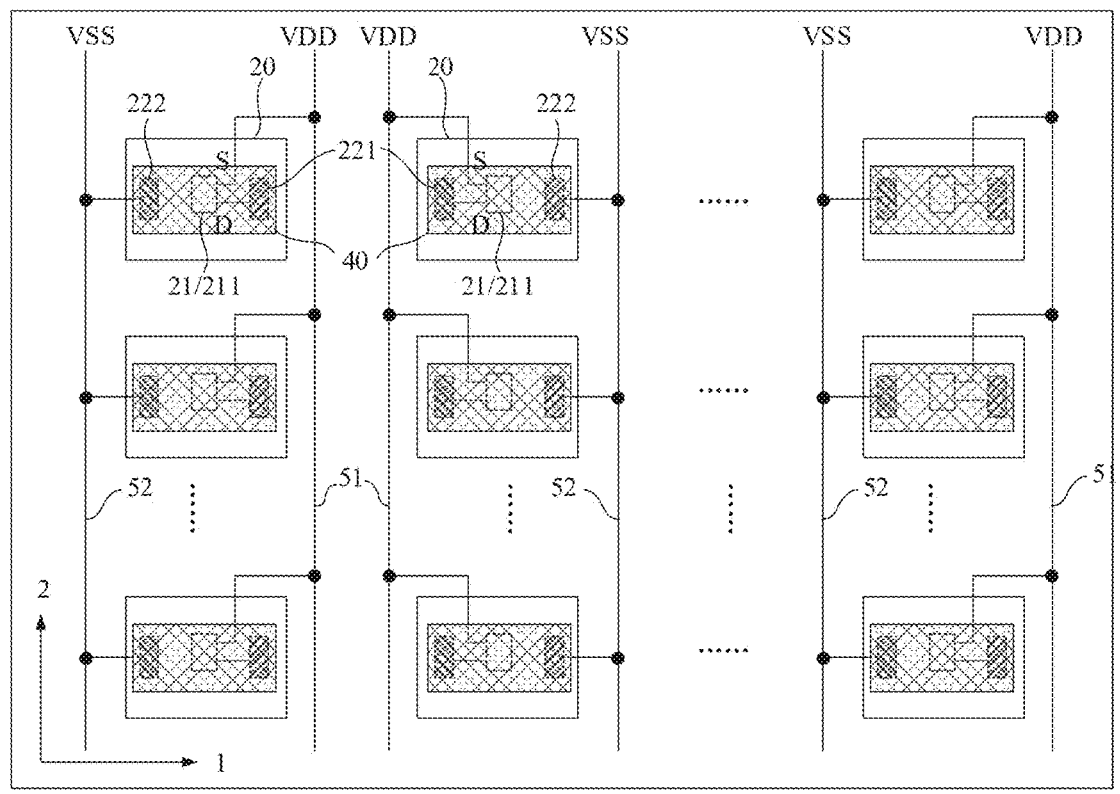
FIG. 5 is a structural diagram of another array substrate according to an embodiment of the present disclosure.

FIG. 5 is a structural diagram of another array substrate according to an embodiment of the present disclosure. Referring to FIG. 5, the array substrate also includes the plurality of first power signal lines 51 and the plurality of second power signal lines 52, where the plurality of first power signal lines 51 and the plurality of second power signal lines 52 are all arranged in sequence along the row direction 1 and extend along the column direction 2; the at least one thin film transistor 21 includes the driving transistor 211; in each driving unit 20, the drain electrode D of the driving transistor 211 is electrically connected to the first electrode 221; the source electrodes S of the driving transistors 211 in the driving units 20 in the same column are electrically connected to a same first power signal line 51; the second electrodes 222 in the driving units 20 in the same column are electrically connected to a same second power signal line 52; and in the row direction 1, in two adjacent driving units 20, second electrodes 222 are both disposed between two first electrodes 221, or first electrodes 221 are both disposed between two second electrodes 222.

It can be seen from the comparison of FIG. 2 and FIG. 5 that in the array substrate in FIG. 5, in the two adjacent driving units 20 in the row direction, two first electrodes 221 are both disposed between the two second electrodes 222. Alternatively, two second electrodes 222 are both disposed between the two first electrodes 221, that is, relative positions of the first electrode 221 and the second electrode 222 are opposite. In this case, accordingly, two first power signal lines 51 connected to drive units 20 in two adjacent columns are disposed in a middle region, and two second power signal lines 52 are disposed in regions on two sides, respectively; or two second power signal lines 52 are disposed in the middle region, and two first power signal lines 51 are disposed in the regions on two sides, respectively.

Figure 6:
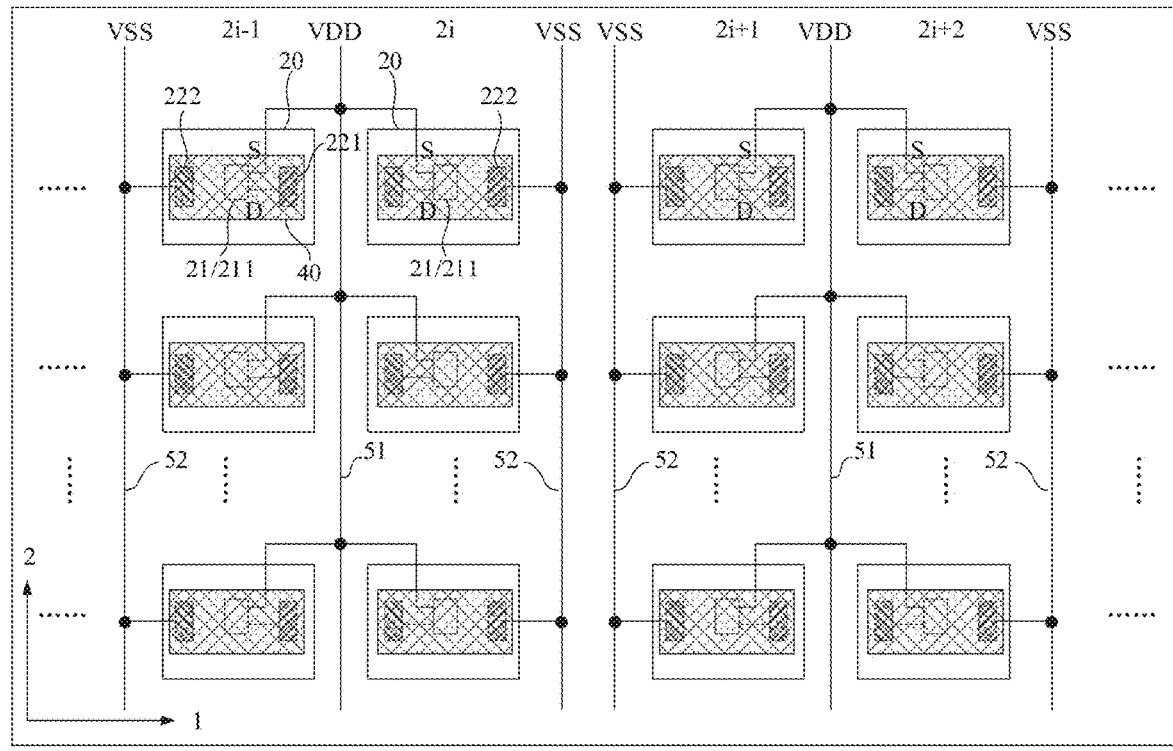
FIGS. 6 to 8 are structural diagrams of another three array substrates according to an embodiment of the present disclosure.
Figure 7:
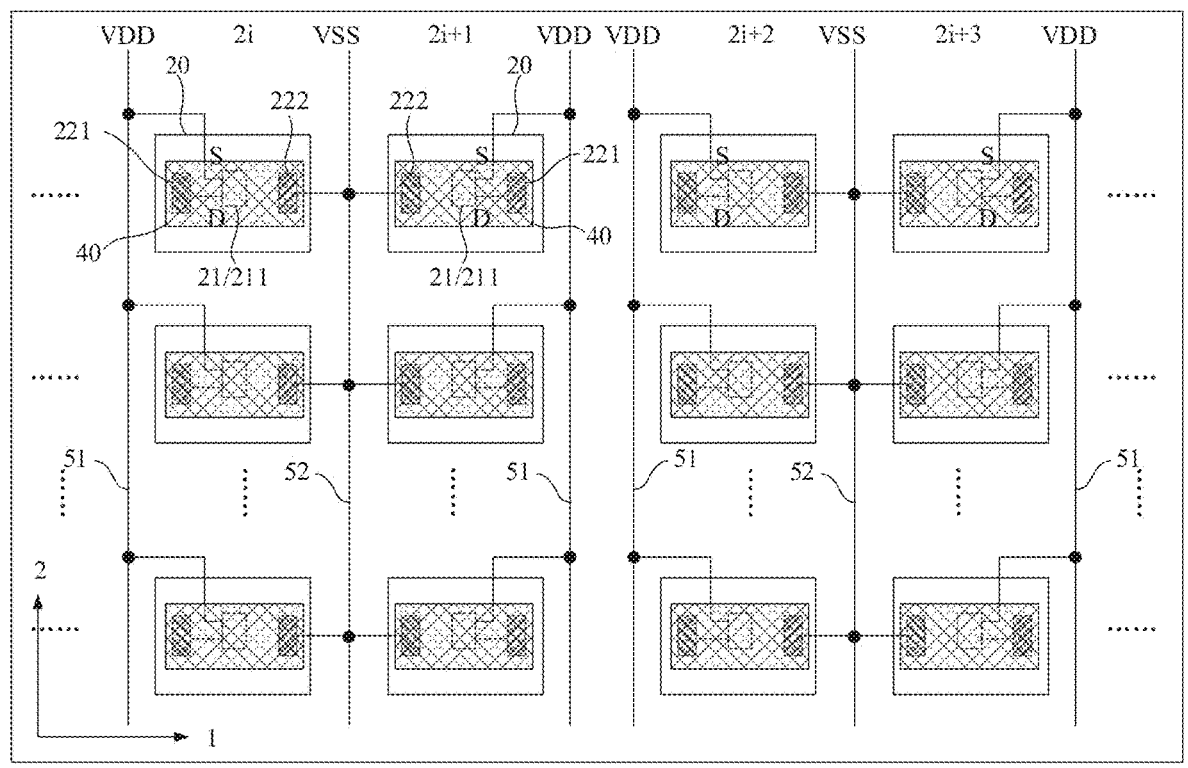
Figure 8:
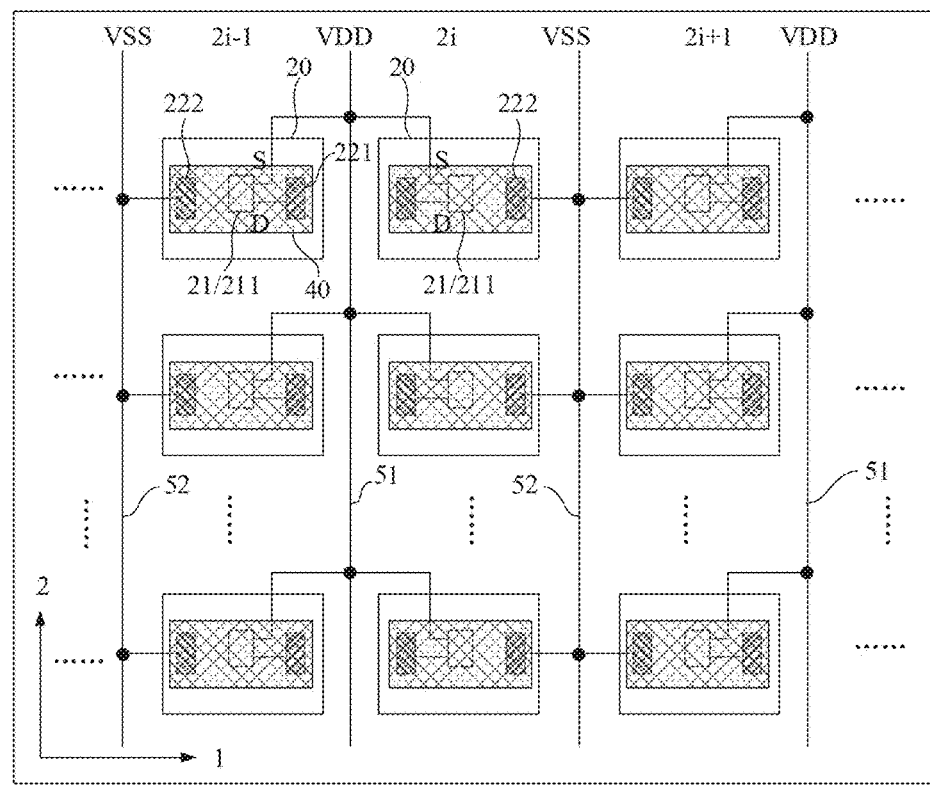

On the basis of the array substrate in FIG. 5, to simplify the structure of the array substrate and reasonably reduce a wiring density on the array substrate, embodiments of the present disclosure further provides an array substrate. FIGS. 6 to 8 are structural diagrams of another three array substrates according to the embodiments of the present disclosure. Referring to FIG. 6, in the array substrate, driving units 20 in a (2i−1)-th column and driving units 20 in a 2i-th column share one first power signal line 51, where i is a positive integer. In other words, in the array substrate in FIG. 5, two first power signal lines 51 exist between part of two adjacent columns of driving units 20, and the first power signal lines 51 provide a same power signal, so the two adjacent first power signal lines 51 may be shared. As shown in FIG. 6, sharing the first power signal line 51 refers to that two adjacent columns of driving units 20 are all connected to one first power signal line 51, that is, the first power signal line 51 provides the same power signal to the two adjacent columns of driving units 20. However, for driving units 20 connected to the same first power signal line 51, a switch may be controlled by the thin film transistor 21, so that each driving unit 20 has no effect on the light-emitting diode 40. Apparently, in this case, the number of first power signal lines 51 on the array substrate is reduced, which not only saves space and improves a pixel resolution, but also helps reduce interference between signal lines and improve a signal transmission quality.

Similarly, since the second power signal lines 52 provide a same power signal, for the array substrate in FIG. 7, the driving units 20 in the 2i-th column and driving units 20 in a (2i+1)-th column share one second power signal line 52, where i is a positive integer. In the array substrate in FIG. 7, two second power signal lines 52 between part of two adjacent columns of driving units 20 are replaced by one second power signal line 52, which can also save space and reduce the interference between signal lines.

Furthermore, in the array substrate in FIG. 8, the driving units 20 in the (2i−1)-th column and the driving units 20 in the 2i-th column share one first power signal line 51, and the driving units 20 in the 2i-th column and the driving units 20 in the (2i+1)-th column share one second power signal line 52, where i is a positive integer. Apparently, both the first power signal line 51 and the second power signal line 52 are shared, and the number of first power signal lines 51 and the number of second power signal lines 52 are both halved, thereby significantly reducing the number of longitudinally extending signal lines. A space utilization rate of the array substrate can be greatly improved, thereby helping improve a resolution of the array substrate.

In addition, it is to be noted that in the array substrates shown in FIGS. 6 to 8, by sharing the first power signal line 51 and/or the second power signal line 52, the space in the array substrate can be saved, and meanwhile, a width of the first power signal line 51 and a width of the second power signal line 52 may be appropriately increased, thereby modifying the impedance of a signal line, reducing an effect of line impedance on signal strength, and ensuring normal transmission of the power signal.

Figure 9:
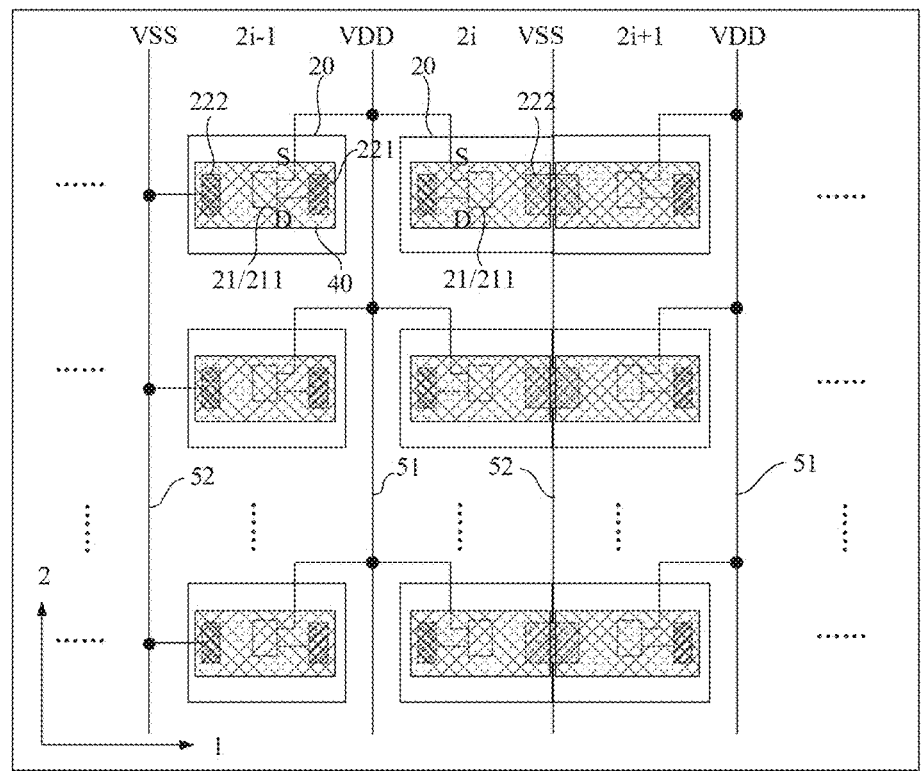
FIG. 9 is a structural diagram of another array substrate according to an embodiment of the present disclosure.

Generally, to save procedures for additionally preparing the first electrode 221 and the second electrode 222, the first power signal line 51 and the second power signal line 52 are directly perforated, and the perforated regions are served as the lead-out electrodes for connecting the anode and cathode of the light-emitting diode 40, that is, the perforated regions on the first power signal line 51 and the second power signal line 52 are served as the first electrode 221 and the second electrode 222 respectively. For each driving unit 20, the first electrode 221 is connected to the thin film transistor 21 in the driving unit 20 for controlling an input of a first power signal, that is, each driving unit 20 controls the corresponding light-emitting diode to be turned on through the first electrode 221. However, the second electrode 222 merely provides a second power signal, so the second electrode 222 can be shared to save the number of perforations. Therefore, on the basis of the above array substrate in which power signal lines are shared, an embodiment of the present disclosure further provides an array substrate. FIG. 9 is a structural diagram of another array substrate according to the embodiment of the present disclosure. Referring to FIG. 9, in the array substrate, optionally, in the row direction 1, a 2i-th driving unit 20 and a (2i+1)-th driving unit 20 share one second electrode 222.

It can be seen from the comparison of FIG. 8 and FIG. 9 that in any two adjacent driving units 20 in the row direction 1, two second electrodes 222 in every two driving units 20 are disposed in a region between the two driving units 20. To save the number of second electrodes 222 and reduce an area occupied by the second electrodes 222, two adjacent second electrodes 222 are replaced with one common second electrode 222. In the case where two driving units 20 share one second electrode 222, when each driving unit 20 is turned on, the first electrode 221 provides the first power signal, and the common second electrode 222 provides the second power signal, so that the corresponding light-emitting diode 40 can be turned on. In this process, the two driving units 20 are controlled to be turned on by the thin film transistors 21 without mutual effects.

Figure 10:
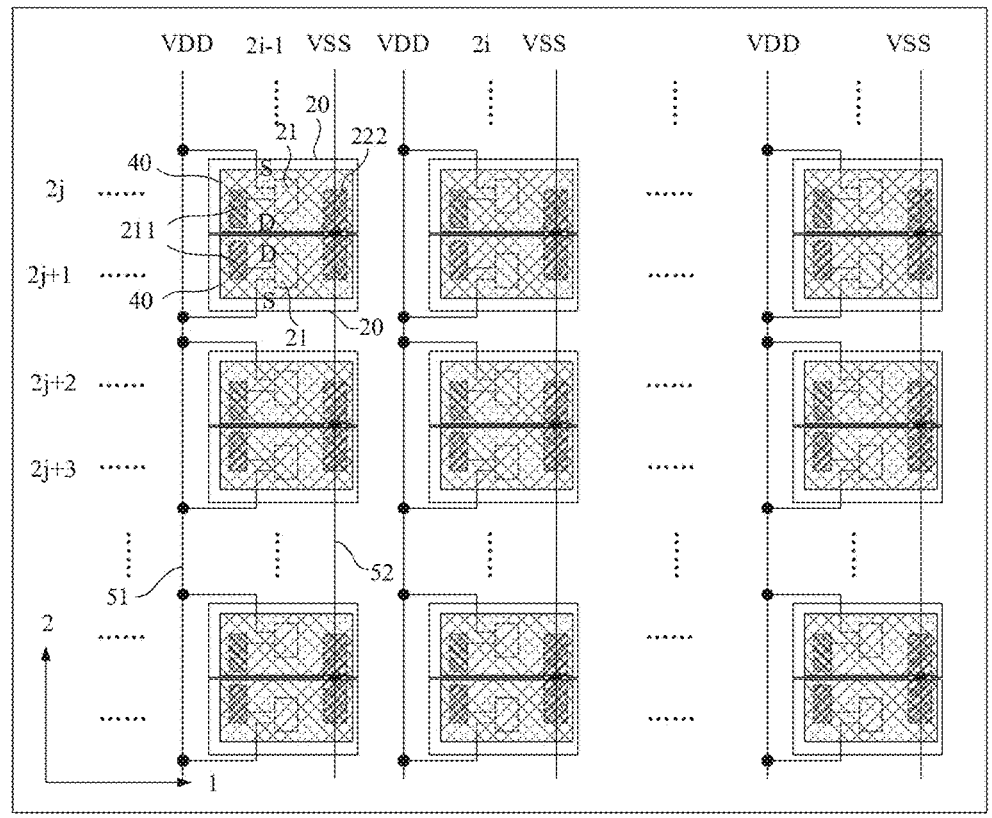
FIGS. 10 and 11 are structural diagrams of another two array substrates according to an embodiment of the present disclosure.
Figure 11:
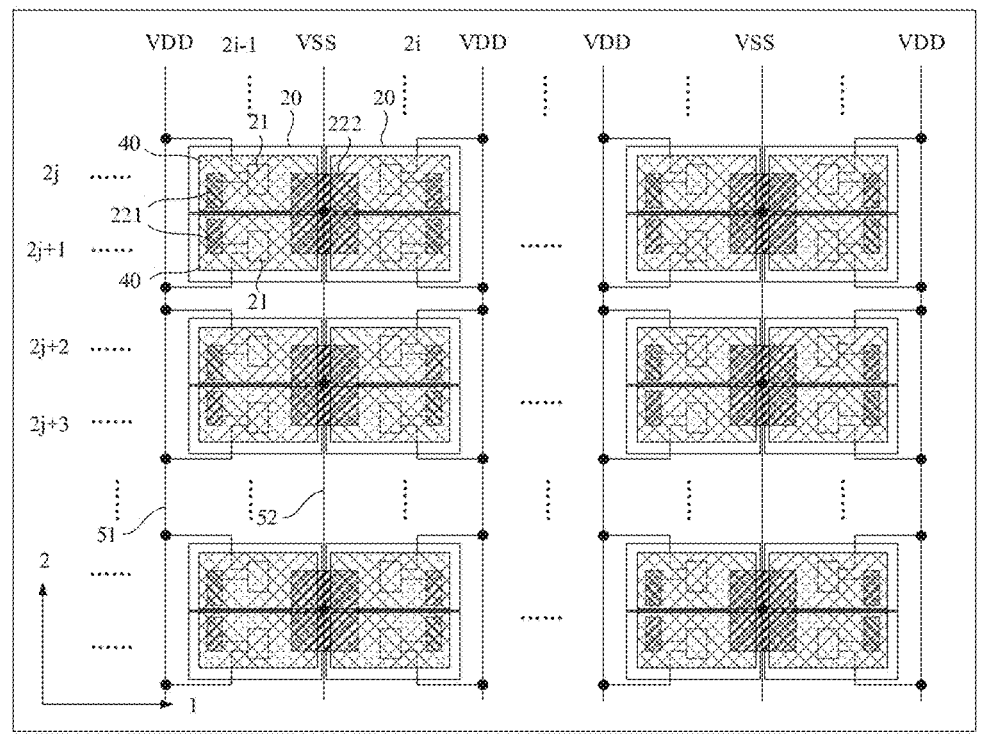

On the basis of the concept of sharing an electrode, in the array substrate provided by the embodiment of the present disclosure, optionally, in the column direction, every two adjacent driving units share one second electrode. FIG. 10 and FIG. 11 are structural diagrams of another two array substrates according to embodiments of the present disclosure. Specifically, referring to FIG. 10 and FIG. 11, in the column direction 2, a 2j-th driving unit 20 and a (2j+1)-th driving unit 20 share one second electrode 222, where j is a positive integer. In a case where two adjacent driving units 20 share one second electrode 222, the two driving units 20 may both be provided with the power signal by the common second electrode 222.

It is to be noted that in the array substrates in FIG. 9, FIG. 10 and FIG. 11, the insulating layer on the second power signal line 52 is perforated, and the exposed part (perforated region) of the second power signal line 52 is used as the second electrode 222. In the procedure of connecting the light-emitting diode 40, the light-emitting diode 40 may be directly electrically connected to the second power signal line 52 through materials such as solder and conductive glue. Therefore, sharing the second electrode 222 refers to welding two light-emitting diodes 40 onto a same perforated region simultaneously. It is understandable that to facilitate the simultaneous welding of two light-emitting diodes 40, those skilled in the art may appropriately enlarge the perforated region (that is, the second electrode 222) on the second power signal line 52, and appropriately increase the width of the second power signal line 52. Therefore, in the embodiments of the present disclosure, the number of perforation can be reduced by sharing the second electrode, and attaching accuracy can be increased by appropriately enlarging the perforated region, that is, the second electrode, which is beneficial to the assembly of light-emitting diodes.

Figure 12:
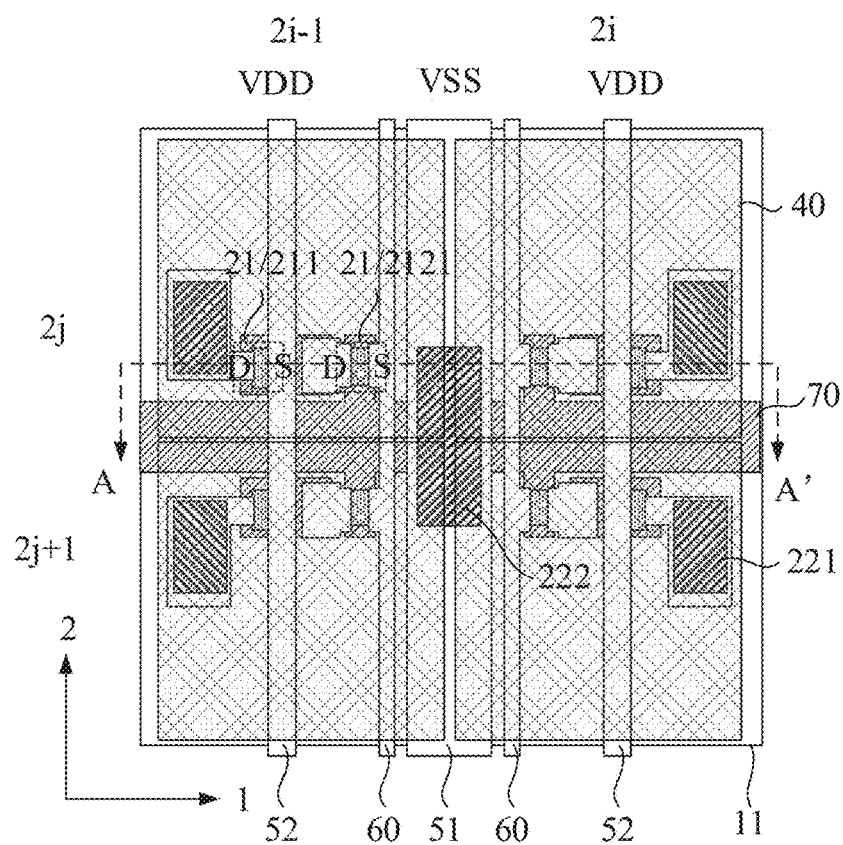
FIG. 12 is a partially-enlarged diagram of another array substrate according to an embodiment of the present disclosure.
Figure 13:
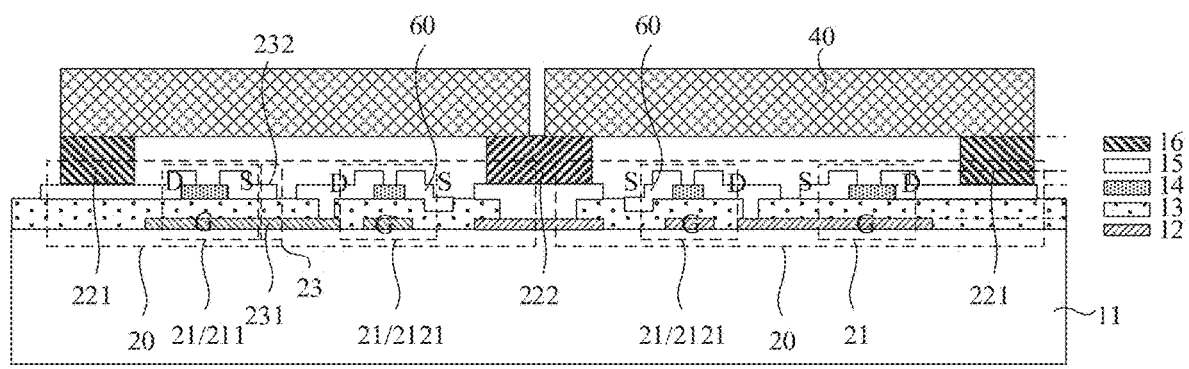
FIG. 13 is a partial sectional view of the array substrate illustrated in FIG. 12 along a line AA'.
Figure 14:
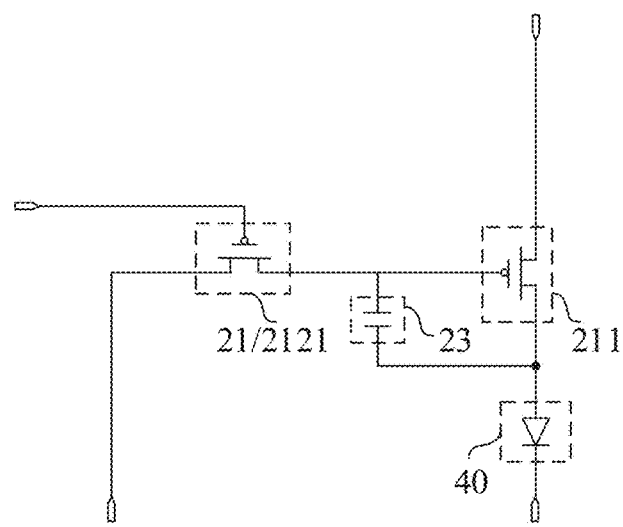
FIG. 14 illustrates a circuit schematic of a driving unit in the array substrate illustrated in FIG. 12.

An embodiment of the present disclosure provides an array substrate in terms of a specific structure of the driving unit. FIG. 12 is a partially-enlarged diagram of another array substrate according to the embodiment of the present disclosure, FIG. 13 is a partial sectional view of the array substrate illustrated in FIG. 12 along a line AA', and FIG. 14 illustrates a circuit schematic of a driving unit in the array substrate illustrated in FIG. 12. Referring to FIGS. 12 to 14, the array substrate further includes a plurality of data signal lines 60 and a plurality of scanning signal lines 70, where the plurality of data signal lines 60 are arranged in sequence along the row direction 1 and extend along the column direction 2, and the plurality of scanning signal lines 70 are arranged in sequence along the column direction 2 and extend along the row direction 1. The at least one thin film transistor 21 further includes a first switch transistor 2121, and the driving unit 20 further includes a storage capacitor 23. Gate electrodes G of first switch transistors 2121 of driving units 20 in each row are electrically connected to a same scanning signal line 70, and source electrodes S of first switch transistors 2121 of driving units 20 in each column are electrically connected to a same data signal line 60. In each driving unit 20, a drain electrode D of the first switch transistor 2121 is electrically connected to a gate electrode G of the driving transistor 211 and a first electrode 231 of the storage capacitor 23, and the drain electrode D of the driving transistor 211 is further electrically connected to a second electrode 232 of the storage capacitor 23.

Figure 15:
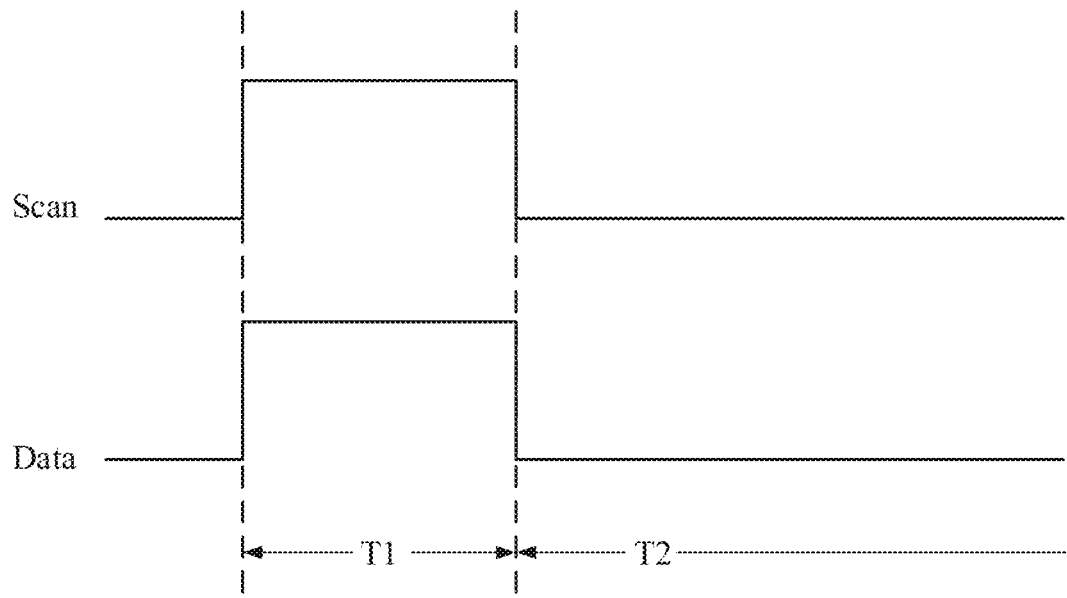
FIG. 15 is a timing sequence diagram of the driving unit illustrated in FIG. 14.

A driving circuit structure of 2T1C is adopted, and a data signal can be stably written to the driving unit through the storage capacitor 23. In particular, FIG. 15 is a timing sequence diagram of the driving unit illustrated in FIG. 14. Referring to FIG. 14 and FIG. 15, in a T1 phase, the scanning signal line 70 provides a scanning signal Scan to a gate electrode G of the first switch transistor 2121, thereby the first switch transistor 2121 is turned on; and meanwhile, the data signal line 60 provides a data signal Data through a source electrode S of the first switch transistor 2121. Therefore, a data voltage is written to the gate electrode G of the driving transistor 211, and a current corresponding to a gate voltage continues to flow, so that the light-emitting diode 40 is driven to be turned on with the current. It is to be noted that since the storage capacitor 23 is connected in parallel between the gate electrode and the drain electrode of the driving transistor 211, the storage capacitor 23 can maintain the stability of the data voltage across the gate electrode G, thereby ensuring stable brightness of the light-emitting diode.

As shown in FIG. 12 and FIG. 13, in the array substrate composed of 2T1C driving units 20, two thin film transistors 21 in the driving unit 20 are both disposed between the first electrode 221 and the second electrode 222, so that the light-emitting diode 40 covers the two thin film transistors 21 when it is correspondingly connected to the driving unit 20, so as to ensure that the thin film transistors 21, especially the driving transistor 211, can be protected from being affected by the external light. In this way, the driving transistor 211 can accurately provide, according to the data signal provided by the gate electrode G, a driving current to the light-emitting diode 40, thereby ensuring lighting accuracy of the light-emitting diode 40 and a display effect.

In addition, in the array substrate shown in FIG. 12 and FIG. 13, to simplify the structure of the array substrate, reduce the difficulty of preparation processes, and improve the resolution of the array substrate, in the row direction 1, the driving units 20 in the (2i−1)-th column and the driving units 20 in the 2i-th column share one first power signal line 51, and the (2i−1)-th driving unit 20 and the 2i-th driving unit 20 share one second electrode 222; and in the column direction 2, the 2j-th driving unit 20 and the (2j+1)-th driving unit 20 share one second electrode 222, where i and j are both positive integers. That is, each first power signal line 51 is connected to two columns of driving units 20, and each second electrode 222 is connected to four adjacent driving units 20. In this case, the corresponding light-emitting diodes 40 may be turned on through the control of the switching of the thin film transistors 21 of the four adjacent driving units 20 may turn on.

It is to be noted that as shown in FIG. 13, the first electrode 221 and the second electrode 222 are part of exposed metal layer by the perforation process of the insulating layer. The light-emitting diode 40 is welded to the first electrode 221 and the second electrode 222 through conductive materials such as the conductive glue. In a process of welding the light-emitting diode 40, the exposed metal layer needs to be dispensed to form a solder joint. As shown in FIG. 13, one solder joint may be optionally provided on the second electrode 222 to simultaneously weld cathodes of two light-emitting diodes 40. In addition, the exposed metal layer may also be dispensed separately, that is, two solder joints are provided on the second electrode 222, and the cathodes of the two light-emitting diodes 40 are electrically connected to the second electrode 222 through the two solder joints, respectively.

With continued reference to FIG. 12 and FIG. 13, optionally, in the array substrate, each data signal line 60 is disposed between first electrodes 221 and second electrodes 222 of driving units 20 in the corresponding column. On one hand, the data signal line 60 can be directly electrically connected to the driving transistor 211 between the first electrode 221 and the second electrode 222. On the other hand, the number of wires between adjacent driving units can be reduced, and an interval between driving units can be reduced, which is beneficial to the improvement of the resolution of the array substrate.

Furthermore, with continued reference to FIG. 12 and FIG. 13, in the array substrate, the scanning signal lines 70, the gate electrode G of the first switch transistor 2121, the gate electrode G of the driving transistor 211 and the first electrode 231 of the storage capacitor 23 are arranged in a same layer; an active layer of the first switch transistor 2121 and an active layer of the driving transistor 211 are arranged in a same layer; the data signal lines 60, the source electrode S and the drain electrode D of the first switch transistor 2121, the source electrode S and the drain electrode D of the driving transistor 211, the second electrode 232 of the storage capacitor 23, the first power signal lines 51 and the second power signal lines 52 are arranged in a same layer; and the first electrode 221 and the second electrode 222 are arranged in a same layer.

Exemplarily, in the array substrate, the array substrate further includes a base substrate 11 and a first metal layer 12, an insulating layer 13, an active layer 14, a second metal layer 15 and a third metal layer 16 which are disposed in sequence on the base substrate 11; where the scanning signal lines 70, the gate electrode G of the first switch transistor 2121, the gate electrode G of the driving transistor 211 and the first electrode 231 of the storage capacitor 23 may be disposed in the first metal layer 12; the data signal lines 60, the source electrode S and the drain electrode D of the first switch transistor 2121, the source electrode S and the drain electrode D of the driving transistor 211, the second electrode 232 of the storage capacitor 23, the first power signal lines 51 and the second power signal lines 52 may all be disposed in the second metal layer 15; and the first electrode 221 and the second electrode 222 may be disposed in the third metal layer 16.

Figure 16:
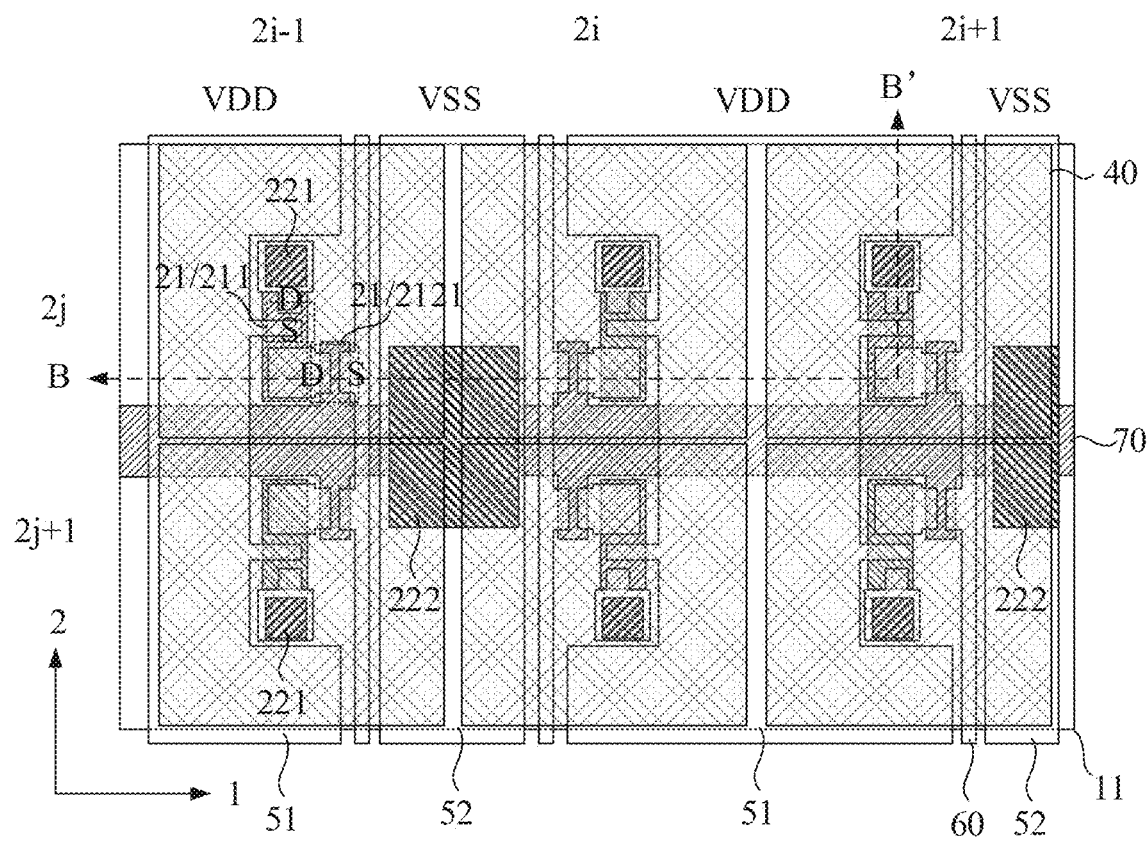
FIG. 16 is a partial structural diagram of another array substrate according to an embodiment of the present disclosure.
Figure 17:
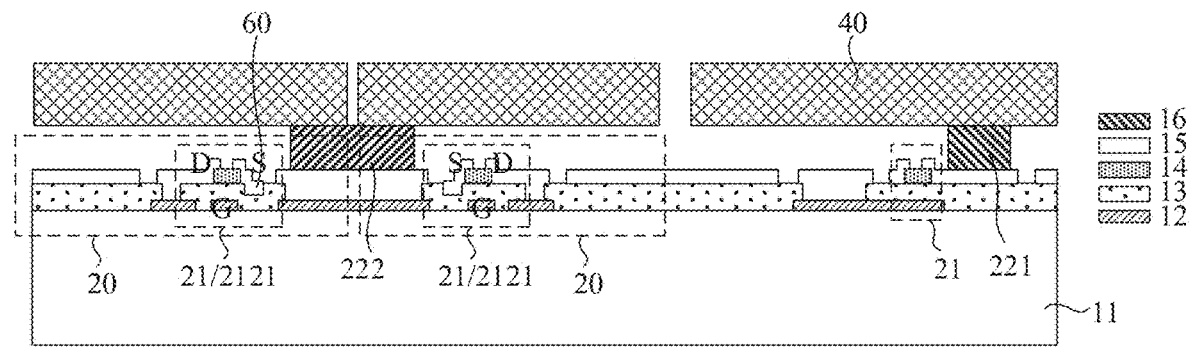
FIG. 17 is a partial sectional view of the array substrate illustrated in FIG. 16 along a line BB'.

On the basis of the 2T1C circuit structure, an embodiment of the present disclosure further provides an array substrate. FIG. 16 is a partial structural diagram of another array substrate according to the embodiment of the present disclosure. FIG. 17 is a partial sectional view of the array substrate illustrated in FIG. 16 along a line BB'. Referring to FIG. 16 and FIG. 17, in the array substrate, in the row direction 1, the driving units 20 in the (2i−1)-th column and the driving units 20 in the 2i-th column share one first power signal line 51, and the driving units 20 in the 2i-th column and the driving units 20 in the (2i+1)-th column share one second power signal line 52, and the 2i-th driving unit 20 and the (2i+1)-th driving unit 20 share one second electrode 222; and in the column direction 2, the 2j-th driving unit 20 and the (2j+1)-th driving unit 20 share one second electrode 222, where i and j are both positive integers. In this case, each first power signal line 51 and each second power signal line 52 are both connected to two columns of driving units 20, and each second electrode 222 is connected to four adjacent driving units 20.

It is to be noted that a structural relationship of films shown in the above sectional view is merely an embodiment of the present disclosure. Those skilled in the art may design the films according to practical process conditions, process requirements and the like, which is not limited in the embodiments of the present disclosure. Of course, in terms of different panel requirements, to avoid the effect on the electrical characteristics of the thin film transistor, in the array substrate provided by the embodiments of the present disclosure, driving circuit structure such as 6T1C and 7T1C may also be adopted, which is also not limited herein.

Figure 18:
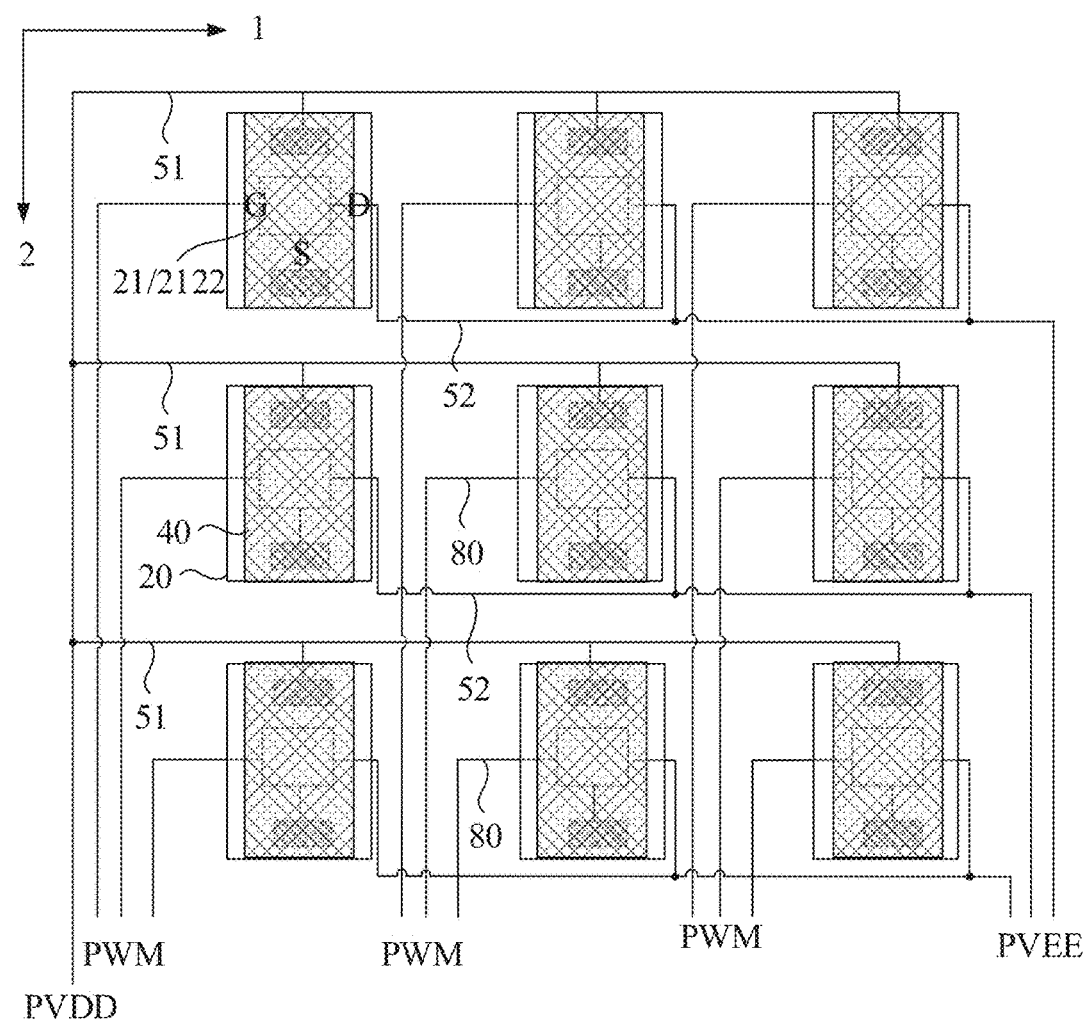
FIG. 18 is a structural diagram of another array substrate according to an embodiment of the present disclosure.

In all the array substrates provided in the above-mentioned embodiments, the driving circuit structure such as 2T1C, 6T1C or 7T1C is adopted, and the light-emitting diode is driven and controlled in a current driving manner. In addition, an embodiment of the present disclosure further provides an array substrate. FIG. 18 is a structural diagram of another array substrate according to the embodiment of the present disclosure. Referring to FIG. 18, the array substrate includes a plurality of first power signal lines 51 and a plurality of second power signal lines 52, where the plurality of first power signal lines 51 and the plurality of second power signal lines 52 are all arranged in sequence along a column direction 2 and extend along a row direction 1; the at least one thin film transistor 21 includes a second switch transistor 2122; drain electrodes D of second switch transistors 2122 of driving units 20 in a same row are all electrically connected to a same second power signal line 52. The array substrate further includes a plurality of pulse-modulated driving signal lines 80, where each of the plurality of pulse-modulated driving signal lines 80 corresponds to a respective one of the plurality of driving units 20. Each of the plurality of pulse-modulated driving signal lines 80 is electrically connected to a gate electrode G of the second switch transistor 2122 in a corresponding driving unit 20. In each driving unit 20, a source electrode S of the second switch transistor 2122 is electrically connected to the first electrode 221; and second electrodes 222 in the driving units 20 in the same row are all electrically connected to a same first power signal line 51. The driving unit 20 controls the light-emitting diode 40 to be turned on or off according to a pulse-modulated driving signal provided by the pulse-modulated driving signal line 80.

The brightness of the light-emitting diode 40 is controlled by a duty ratio of the pulse-modulated driving signal provided by the pulse-modulated driving signal line 80. In particular, the second switch transistor 2122 in the driving unit 20 may be a metal-oxide-semiconductor (MOS) transistor, and the second switch transistor 2122 is controlled to be continuously turned on by the pulse-modulated driving signal provided by the pulse-modulated driving signal line 80. When the second switch transistor 2122 is turned on, the first power signal line 51 provides the first power signal to the light-emitting diode 40 through the second switch transistor 2122. The higher the duty ratio of the pulse-modulated driving signal is, the higher the flicker frequency of the light-emitting diode 40 is. And thus, the brightness of the light-emitting diode 40 is brighter from the perspective of human eye perception. Therefore, in the array substrate, the turned on or turned off and the brightness of each light-emitting diode 40 are controlled in a pulse modulation driving manner, so as to achieve the picture display or the backlight.

The array substrate based on the pulse modulation driving manner reasonably sets the positions of the first electrode 221 and the second electrode 222 in the driving unit 20, such that the light-emitting diode 40 covers a transistor in the driving unit when it is connected to the driving unit 20, thereby avoiding the effect of the external light on the electrical performance of the transistor, and ensuring the lighting control accuracy of each light-emitting diode, and the display effect or a backlight effect.

Figure 19:
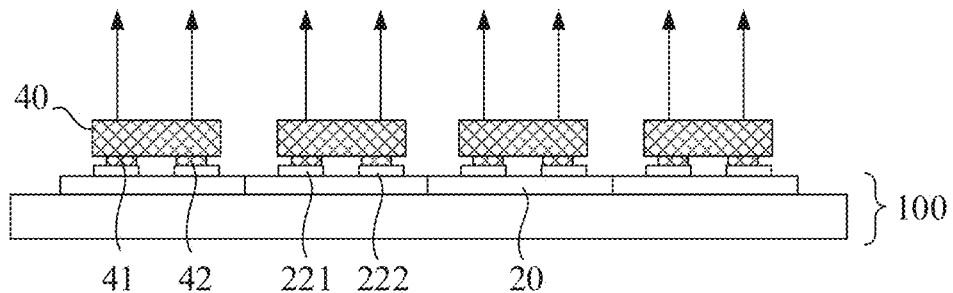
FIG. 19 is a structural diagram of a backlight module according to an embodiment of the present disclosure.

An embodiment of the present disclosure further provides a backlight module. FIG. 19 is a structural diagram of a backlight module according to the embodiment of the present disclosure. Referring to FIG. 19, the backlight module includes any one of the array substrates 100 according to the above-mentioned embodiments, and the backlight module further includes a plurality of light-emitting diodes 40, where each of the plurality of light-emitting diodes 40 is arranged in a one-to-one correspondence with a respective one of a plurality of driving units 20 in the array substrate 100. An anode 41 and a cathode 42 of the light-emitting diode 40 are electrically connected to a first electrode 221 and a second electrode 222 in the driving unit 20, respectively, and a vertical projection of the light-emitting diode 40 on the array substrate 100 overlaps with the at least one thin film transistor in the driving unit 20.

Figure 20:
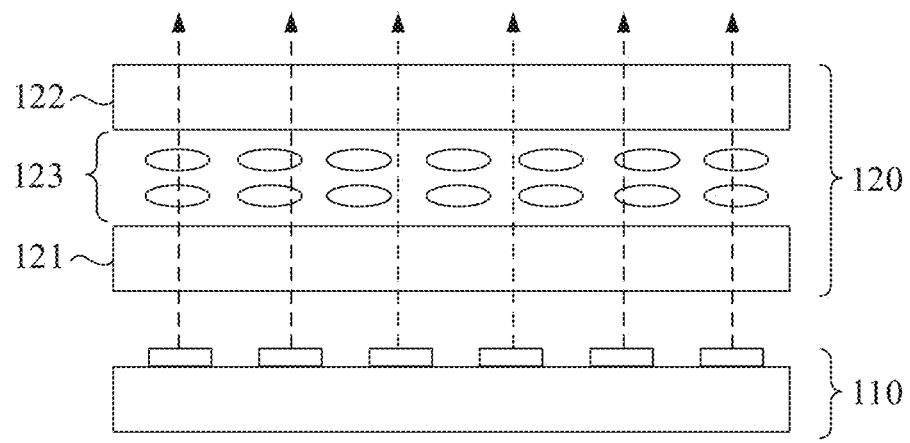
FIG. 20 is a structural diagram of a liquid crystal display panel according to an embodiment of the present disclosure.

An embodiment of the present disclosure further provides a liquid crystal display panel. FIG. 20 is a structural diagram of a liquid crystal display panel according to the embodiment of the present disclosure. Referring to FIG. 20, the liquid crystal display panel includes the backlight module 110 according to the above embodiment, and further includes a liquid crystal panel 120 which is disposed on a light-emitting side of the backlight module 110. The backlight module 110 provides backlight for the liquid crystal panel 120. The liquid crystal panel 120 is provided with an array substrate 121 for display driving, a color filter substrate 122 for filtering light and a liquid crystal layer 123 for regulating light emission. Liquid crystal molecules in the liquid crystal layer 123 are driven by pixel electrodes in the array substrate 121 to be deflected, so as to control backlight emission, and the color filter substrate 122 filters the light to achieve the lighting of particular colors.

Figure 21:
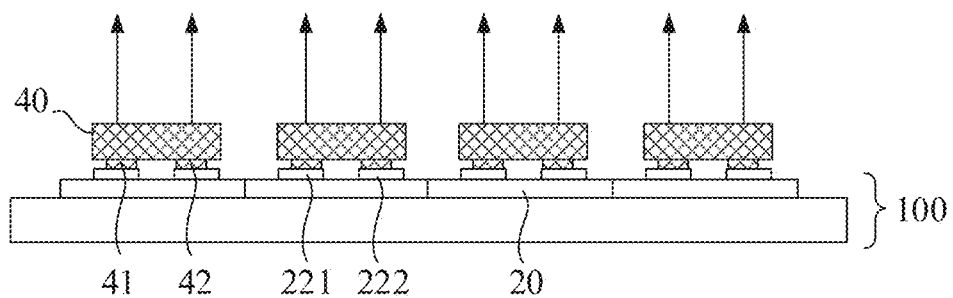
FIG. 21 is a structural diagram of a light-emitting diode display panel according to an embodiment of the present disclosure.

An embodiment of the present disclosure further provides a light-emitting diode display panel. FIG. 21 is a structural diagram of a light-emitting diode display panel according to the embodiment of the present disclosure. Referring to FIG. 21, the light-emitting diode display panel includes any one of the array substrates 100 according to the above-mentioned embodiments, and the light-emitting diode display panel further includes a plurality of light-emitting diodes 40, where each of the plurality of light-emitting diodes 40 is arranged in a one-to-one correspondence with a respective one of a plurality of driving units 20 in the array substrate 110. An anode 41 and a cathode 42 of the light-emitting diode 40 are electrically connected to a first electrode 221 and a second electrode 222 in the driving unit 20, respectively, and a vertical projection of the light-emitting diode 40 on the array substrate 110 overlaps with the at least one thin film transistor in the driving unit 20.

With the array substrate provided by the embodiments of the present disclosure, the driving units 20 may control the light-emitting diodes 40 to be turned on, and the light-emitting diodes 40 cooperate to achieve the picture display. Specifically, in the light-emitting diode display panel provided by the embodiment of the present disclosure, the light-emitting diode optionally may be a mini-LED or a micro-LED, and may be reasonably selected by those skilled in the art according to a resolution requirement of the display panel. In addition, in the light-emitting diode display panel provided by the embodiment of the present disclosure, the light-emitting diodes may be light-emitting diodes emitting a plurality of colors, for example, red light-emitting diodes, green light-emitting diodes and blue light-emitting diodes, and a full-color display can be achieved by the corporation of the diodes. Furthermore, the light-emitting diode may also be light-emitting diode emitting a single color, and color filters are employed to achieve color conversion, and then the full-color display is achieved. The type of the light-emitting diode is not limited in the embodiments of the present disclosure.

Figure 22:
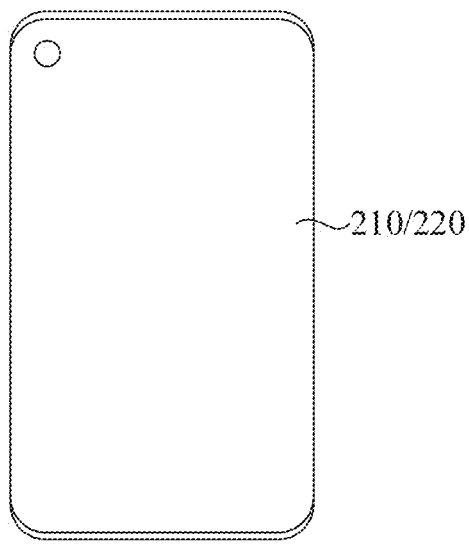
FIG. 22 is a structural diagram of a display device according to an embodiment of the present disclosure.

An embodiment of the present disclosure further provides a display device. FIG. 22 is a structural diagram of a display device according to the embodiment of the present disclosure. Referring to FIG. 22, the display device may include the liquid crystal display panel 210 according to the above-mentioned embodiment, and may also include the light-emitting diode display panel 220 according to the above-mentioned embodiment. Since the liquid crystal display panel 210 and the light-emitting diode display panel 220 described above both adopt the array substrate according to the above-mentioned embodiments, the liquid crystal display panel, the light-emitting diode display panel and the display device all have same technical effects as the array substrate. In particular, the display device may be a mobile phone, a tablet, a computer, a television, a smart wearable device or the like, which is also not limited in this embodiment of the present disclosure.

Figure 23:
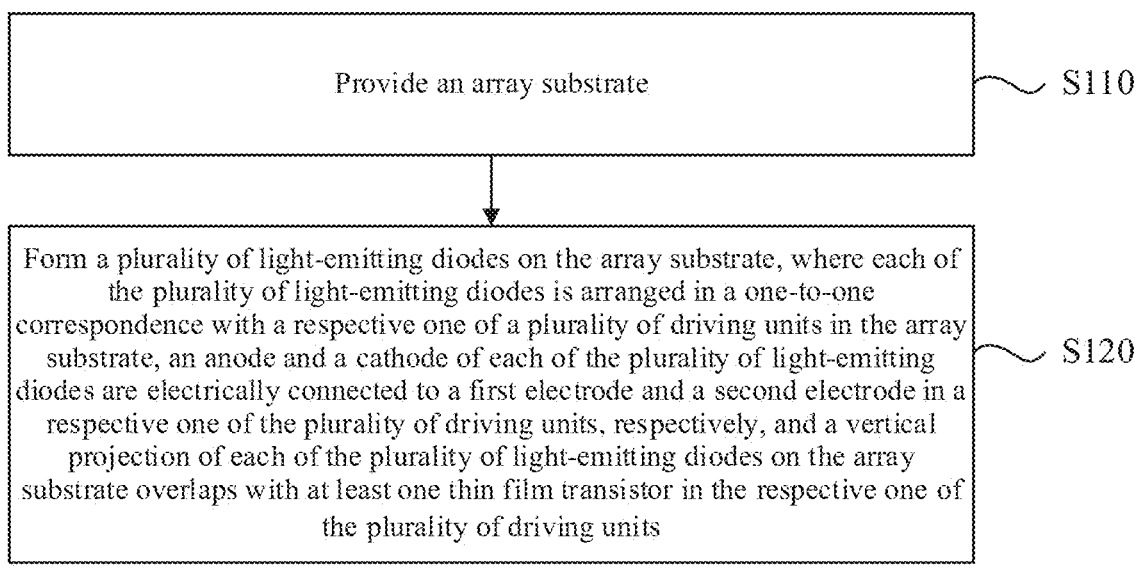
FIG. 23 is a flowchart of a preparation method for a backlight module or a light-emitting diode display panel according to an embodiment of the present disclosure.

On the basis of the array substrate, the backlight module and the light-emitting diode display panel according to the above-mentioned embodiments, an embodiment of the present disclosure further provides a preparation method for the backlight module or the light-emitting diode display panel. FIG. 23 is a flowchart of a preparation method for a backlight module or a light-emitting diode display panel according to the embodiment of the present disclosure. In the preparation method, any one of the array substrates according to the above-mentioned embodiments may be adopted. Referring to FIG. 19, FIG. 21 and FIG. 23, the preparation method includes steps described below.

In S110, an array substrate 110 is provided.

In S120, a plurality of light-emitting diodes 40 is formed on the array substrate 110, where each of the plurality of light-emitting diodes 40 is arranged in a one-to-one correspondence with a respective one of a plurality of driving units 20 in the array substrate 110. An anode 41 and a cathode 42 of the light-emitting diode 40 are electrically connected to a first electrode 221 and a second electrode 222 in the driving unit 20, respectively, and a vertical projection of the light-emitting diode 40 on the array substrate 110 overlaps with the at least one thin film transistor 21 in the driving unit 20.

The first electrode 221 and the second electrode 222 in the array substrate 110 can ensure that the light-emitting diode 40 covers the at least one thin film transistor 21 when the light-emitting diode 40 is connected thereto, that is, the vertical projection of the light-emitting diode 40 on the array substrate 110 overlaps with the at least one thin film transistor 21, and thus the light-emitting diode can replace a light-shielding layer to block external light, thereby avoiding an effect of the external light on the thin film transistor, solving the problem of complicated preparation processes due to the additional arrangement of an light-shielding layer in an existing array substrate, and ensuring electrical characteristics of the thin film transistor. In addition, masks and preparation procedures required for preparing the light-shielding layer can also be avoided, therefore a process for preparing the array substrate is simplified, and manufacturing costs are reduced.

Figure 24:
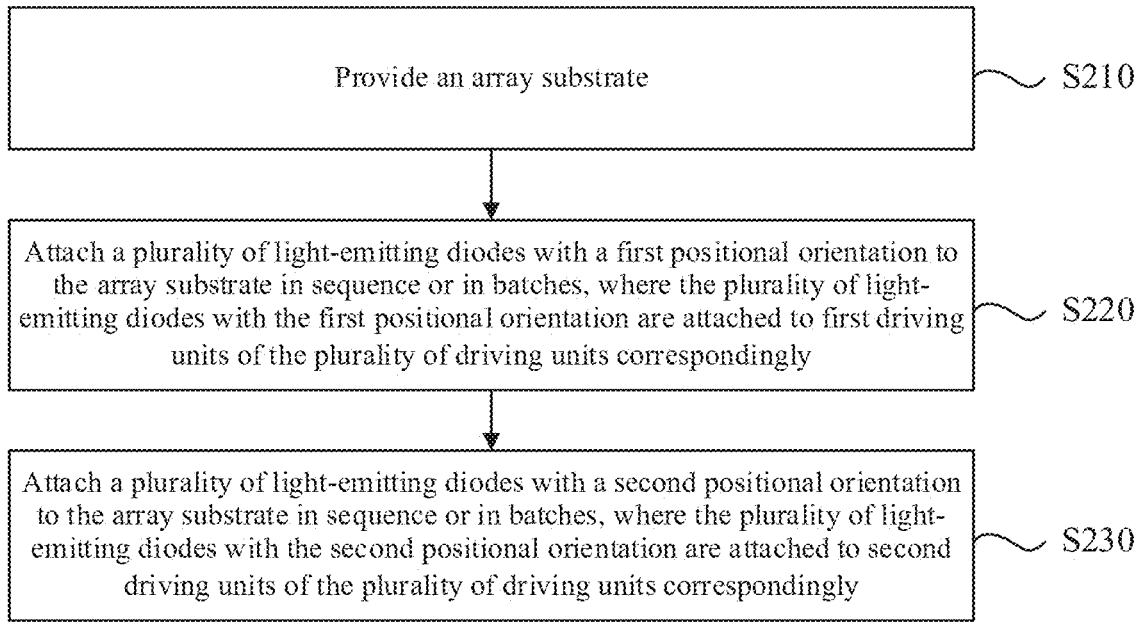
FIG. 24 is a flowchart of a preparation method for a backlight module or a light-emitting diode display panel according to an embodiment of the present disclosure.

For the array substrate in FIG. 5, an embodiment of the present disclosure further provides a preparation method for a backlight module or a light-emitting diode display panel. Referring to FIG. 5, in the array substrate, the driving units 20 include first driving units 21 and second driving units 22, where relative positions of the first electrode 221 and the second electrode 222 in the first driving unit 21 are opposite to relative positions of the first electrode 221 and the second electrode 222 in the second driving unit 22. FIG. 24 is a flowchart of a preparation method for a backlight module or a light-emitting diode display panel according to the embodiment of the present disclosure. Referring to FIG. 5 and FIG. 24, the preparation method includes steps described below.

In S210, an array substrate 110 is provided.

In S220, a plurality of light-emitting diodes 40 with a first positional orientation are attached to the array substrate 110 in sequence or in batches, where the plurality of light-emitting diodes 40 with a first positional orientation are attached to the first driving units 21 correspondingly.

In S230, a plurality of light-emitting diodes 40 with a second positional orientation are attached to the array substrate 110 in sequence or in batches, where the plurality of light-emitting diodes 40 with a second positional orientation are attached to the second driving units 22 correspondingly.

The first driving unit 21 may refer to a driving unit 20 in which the first electrode 221 is disposed on a left side of the second electrode 222, and the second driving unit 22 may refer to a driving unit 20 in which the first electrode 221 is disposed on a right side of the second electrode 222. Apparently, when the two driving units 20 are attached with light-emitting diodes 40, the positional orientation of the light-emitting diode 40 needs to be reasonably set, such that the anode 41 of the light-emitting diode 40 corresponding to the first driving unit 21 is on the left side and the cathode 42 is on the right side, and this positional orientation may be configured as the first positional orientation. For another positional orientation, the anode 41 of the light-emitting diode 40 corresponding to the second driving unit 22 is on the right side and the cathode 42 is on the left side, and this positional orientation may be configured as the second positional orientation. The light-emitting diodes 40 with the first positional orientation are attached in sequence or in batches, and then the light-emitting diodes 40 with the second positional orientation are attached in sequence or in batches, so that the light-emitting diodes 40 can be rotated in batches in advance to reduce time required for rotating the light-emitting diodes 40 in the attaching process, thereby reducing the time for attaching the light-emitting diodes 40 and improving attaching efficiency.

Figure 25:
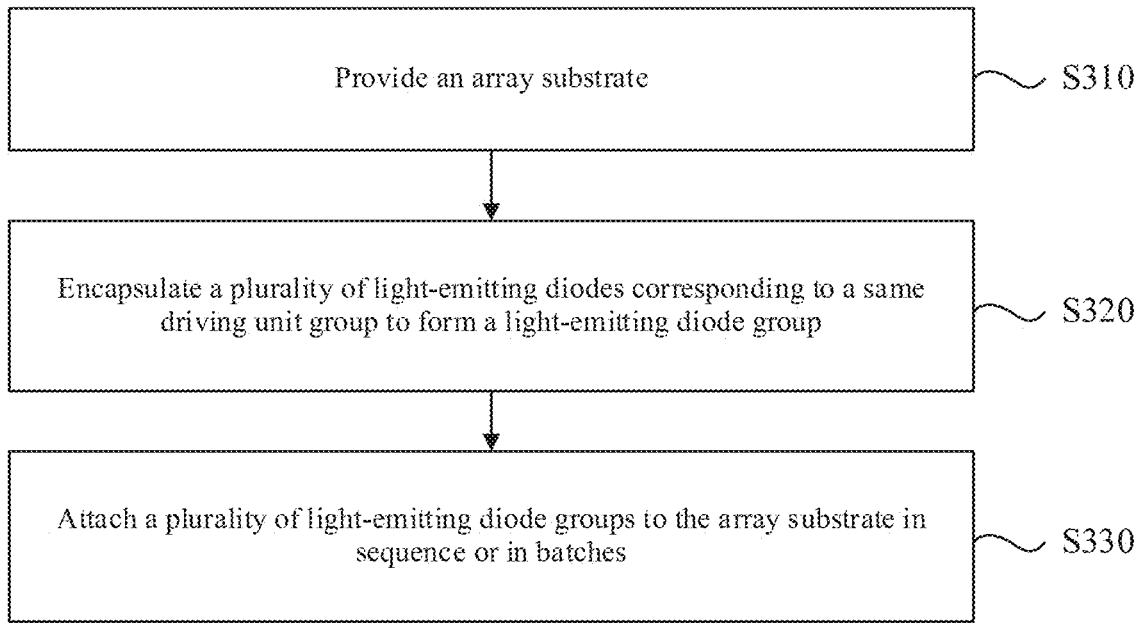
FIG. 25 is a flowchart of a preparation method for a backlight module or a light-emitting diode display panel according to an embodiment of the present disclosure.

Similarly, for the array substrates in FIG. 9, FIG. 10 and FIG. 11, an embodiment of the present disclosure further provides a preparation method for a backlight module or a light-emitting diode display panel. In the array substrates in FIG. 9, FIG. 10 and FIG. 11, in the row direction 1, a 2i-th driving unit 20 and a (2i+1)-th driving unit 20 share one second electrode 222, wherein i is a positive integer; and/or in the row direction 1, the first electrode 221 and the second electrode 222 are alternately arranged in sequence; in the column direction 2, a 2j-th driving unit 20 and a (2j+1)-th driving unit 20 share one second electrode 222, wherein j is a positive integer. FIG. 25 is a flowchart of a preparation method for a backlight module or a light-emitting diode display panel according to the embodiment of the present disclosure. Referring to FIG. 9, FIG. 10, FIG. 11 and FIG. 25, where driving units 20 which share one second electrode 222 in the row direction 1 and/or the column direction 2 are served as a driving unit group, the preparation method includes steps described below.

In S310, an array substrate 110 is provided.

In S320, a plurality of light-emitting diodes 40 corresponding to a same driving unit group is encapsulated to form a light-emitting diode group.

In S330, a plurality of light-emitting diode groups is attached to the array substrate 110 in sequence or in batches.

In the preparation process, the light-emitting diode groups are attached in sequence or in batches to the driving unit groups, where each of the driving unit groups is composed of the drive units 20 sharing the second electrode 222, so that part of the light-emitting diodes 40 can be rotated in advance to reduce the time required for rotating the light-emitting diodes 40 in the attaching process, thereby reducing the time for attaching the light-emitting diodes 40 and improving attaching efficiency.

Figure 26:
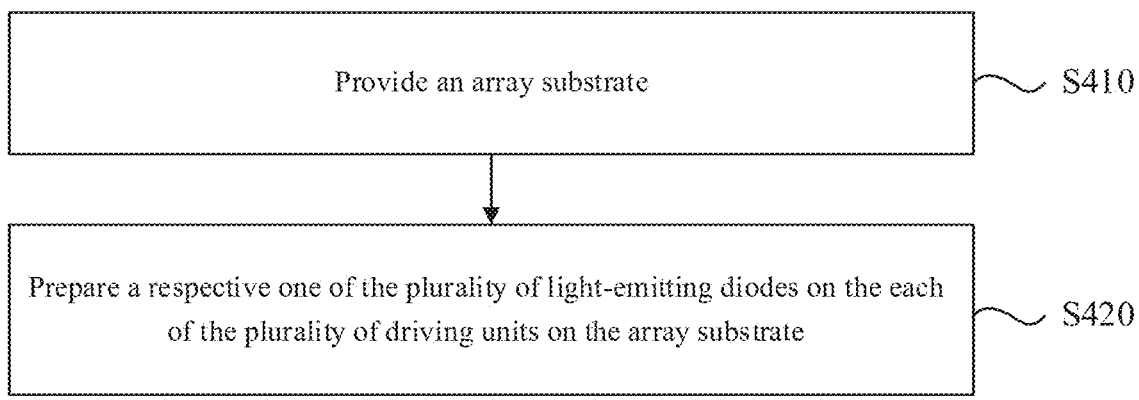
FIG. 26 is a flowchart of another preparation method for a backlight module or a light-emitting diode display panel according to an embodiment of the present disclosure.

In addition, an embodiment of the present disclosure further provides a preparation method for a backlight module or a light-emitting diode display panel. FIG. 26 is a flowchart of another preparation method for a backlight module or a light-emitting diode display panel according to the embodiment of the present disclosure. Referring to FIG. 19, FIG. 21 and FIG. 26, the preparation method includes steps described below.

In S410, an array substrate 110 is provided.

In S420, a respective one of a plurality of light-emitting diodes 40 is prepared on each of a plurality of driving units 20 on the array substrate 110.

The light-emitting diodes 40 are prepared on the driving units 20 by processes such as thermal evaporation, vapor deposition and magnetron sputtering, and electrodes of the light-emitting diodes 40 and functional films are deposited in sequence on the drive units 20 of the array substrate, that is, the light-emitting diodes 40 are directly prepared on the array substrate instead of being formed in a manner of attaching chips of the light-emitting diodes.

It is to be noted that the above are merely preferred embodiments of the present disclosure and the technical principles used therein. It is to be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may further include more other equivalent embodiments without departing from the concept of the present disclosure. The scope of the present disclosure is determined by the scope of the appended claims.

What is claimed is:

1. An array substrate, comprising: a plurality of driving units, a plurality of first power signal lines and a plurality of second power signal lines and a plurality of data signal lines and a plurality of scanning signal lines;
   wherein each of the plurality of driving units comprises a first electrode, a second electrode and at least one thin film transistor;
   wherein the first electrode and the second electrode are configured to be connected to an anode and a cathode of a light-emitting diode, respectively, such that a vertical projection of the light-emitting diode on the array substrate covers an active layer of the at least one thin film transistor, and in a light-emitting direction of the light-emitting diode, the at least one thin film transistor is disposed on a backlight side of the light-emitting diode; and
   wherein the each of the plurality of driving units is configured to control the light-emitting diode to be turned on or off according to a driving signal;
   wherein the plurality of first power signal lines and the plurality of second power signal lines are arranged in sequence along a row direction and extend along a column direction;
   wherein the at least one thin film transistor comprises a driving transistor; in the each of the plurality of driving units, a drain electrode of the driving transistor is electrically connected to the first electrode; source electrodes of driving transistors of driving units in a same column are electrically connected to a same first power signal line; and second electrodes of the driving units in the same column are electrically connected to a same second power signal line;
   wherein in the row direction, in two adjacent driving units, second electrodes ae both disposed between two first electrodes, or first electrodes are both disposed between two second electrodes;
   wherein the plurality of data signal lines are arranged in sequence along the row direction and extend along the column direction, and the plurality of scanning signal lines are arranged in sequence along the column direction and extend along the row direction;
   wherein the at least one thin film transistor further comprises a first switch transistor, and the each of the plurality of driving units further comprises a storage capacitor;
   wherein gate electrodes of first switch transistors of driving units in each row are electrically connected to a same scanning signal line, and source electrodes of first switch transistors of driving units in each column are electrically connected to a same data signal line;

wherein in the each of the plurality of driving units, a drain electrode of the first switch transistor is electrically connected to a gate electrode of the driving transistor and a first electrode of the storage capacitor, respectively, and the drain electrode of the driving transistor is further electrically connected to a second electrode of the storage capacitor;

wherein the plurality of scanning signal lines, a gate electrode of the first switch transistor, the gate electrode of the driving transistor and the first electrode of the storage capacitor are arranged in a same layer;

wherein an active layer of the first switch transistor and an active layer of the driving transistor are arranged in a same layer;

wherein the plurality of data signal lines, a source electrode and the drain electrode of the first switch transistor, a source electrode and the drain electrode of the driving transistor, the second electrode of the storage capacitor, the plurality of first power signal lines and the plurality of second power signal lines are arranged in a same layer; and wherein the first electrode and the second electrode are arranged in a same layer.

2. The array substrate of claim 1, wherein in a direction perpendicular to the light-emitting direction of the light-emitting diode, the first electrode and the second electrode are disposed on opposite sides of the at least one thin film transistor, respectively.

3. The array substrate of claim 2, further comprising: a plurality of first power signal lines and a plurality of second power signal lines, wherein the plurality of first power signal lines and the plurality of second power signal lines are arranged in sequence along a row direction and extend along a column direction;

wherein the plurality of driving units are arranged in an array, the at least one thin film transistor further comprises a driving transistor; in the each of the plurality of driving units, a drain electrode of the driving transistor is electrically connected to the first electrode; source electrodes of driving transistors of driving units in a same column are electrically connected to a same first power signal line; and second electrodes of the driving units in the same column are electrically connected to a same second power signal line; and wherein in the row direction, first electrodes and second electrodes are alternately arranged in sequence.

4. The array substrate of claim 1, wherein driving units in a (2i−1)-th column and driving units in a 2i-th column share one first power signal line, and/or the driving units in the 2i-th column and driving units in a (2i+1)-th column share one second power signal line, where i is a positive integer, wherein in the row direction, a 2i-th driving unit and a (2i+1)-th driving unit share one second electrode.

5. The array substrate of claim 1, wherein in the column direction, a 2j-th driving unit and a (2j-+)-th driving unit share one second electrode, wherein j is a positive integer.

6. The array substrate of claim 1, wherein each of the plurality of data signal lines is disposed between first electrodes and second electrodes of driving units in a corresponding column.

7. The array substrate of claim 1, further comprising: a base substrate, a first metal layer, an insulating layer, an active layer, a second metal layer and a third metal layer, wherein the first metal layer, the insulating layer, the active layer, the second metal layer and the third metal layer are disposed in sequence on the base substrate; wherein the plurality of scanning signal lines, the gate electrode of the first switch transistor, the gate electrode of the driving transistor and the first electrode of the storage capacitor are disposed in the first metal layer;

the plurality of data signal lines, the source electrode and the drain electrode of the first switch transistor, the source electrode and the drain electrode of the driving transistor, the second electrode of the storage capacitor, the plurality of first power signal lines and the plurality of second power signal lines are disposed in the second metal layer; and the first electrode and the second electrode are disposed in the third metal layer.

8. A light-emitting diode display panel, comprising the array substrate of claim 1;

wherein the light-emitting diode display panel further comprises a plurality of light-emitting diodes, each of the plurality of light-emitting diodes is arranged in a one-to-one correspondence with a respective one of a plurality of driving units in the array substrate;

wherein an anode and a cathode of the each of the plurality of light-emitting diodes are electrically connected to a first electrode and a second electrode in a respective one of the plurality of driving units, respectively, and a vertical projection of the each of the plurality of light-emitting diodes on the array substrate covers an active layer of at least one thin film transistor in the respective one of the plurality of driving units.

9. The light-emitting diode display panel of claim 8, wherein each of the plurality of light-emitting diodes comprises any one of a mini-light-emitting diode or a micro-light-emitting diode.

10. The array substrate of claim 1, further comprising: a plurality of first power signal lines and a plurality of second power signal lines, wherein the plurality of first power signal lines and the plurality of second power signal lines are arranged in sequence along a column direction and extend along a row direction;

wherein the at least one thin film transistor comprises a second switch transistor; drain electrodes of second switch transistors of driving units in a same row are electrically connected to a same second power signal line;

wherein the array substrate further comprises a plurality of pulse-modulated driving signal lines, each of the plurality of pulse-modulated driving signal lines corresponds to a respective one of the plurality of driving units, wherein each of the plurality of pulse-modulated driving signal lines is electrically connected to a gate electrode of the second switch transistor of a corresponding driving unit;

wherein in each of the plurality of driving units, a source electrode of the second switch transistor is electrically connected to the first electrode; and second electrodes in the driving units in the same row are electrically connected to a same first power signal line; and wherein each of the plurality of driving units is configured to control the light-emitting diode to be turned on or off according to a pulse-modulated driving signal provided by a respective one of the plurality of pulse-modulated driving signal lines.

* * * * *